(12) United States Patent
Hu et al.

(10) Patent No.: US 12,441,604 B2
(45) Date of Patent: Oct. 14, 2025

(54) MICRO-ELECTROMECHANICAL SYSTEMS (MEMS) DEVICE WITH OUTGAS LAYER

(71) Applicant: Taiwan Semiconductor Manufacturing Company, Ltd., Hsinchu (TW)

(72) Inventors: Fan Hu, Taipei (TW); Wen-Chuan Tai, Hsinchu (TW); Li-Chun Peng, Hsin-Chu (TW); Hsiang-Fu Chen, Zhubei (TW); Ching-Kai Shen, Zhubei (TW); Hung-Wei Liang, New Taipei (TW); Jung-Kuo Tu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 547 days.

(21) Appl. No.: 17/835,175

(22) Filed: Jun. 8, 2022

(65) Prior Publication Data
US 2023/0399226 A1    Dec. 14, 2023

(51) Int. Cl.
*B81B 7/00*    (2006.01)
*B81C 3/00*    (2006.01)

(52) U.S. Cl.
CPC ............. *B81B 7/008* (2013.01); *B81C 3/001* (2013.01); *B81B 2203/033* (2013.01); *B81B 2207/015* (2013.01); *B81C 2201/013* (2013.01)

(58) Field of Classification Search
None
See application file for complete search history.

(56) References Cited

U.S. PATENT DOCUMENTS

| 6,458,495 B1 * | 10/2002 | Tsai ........................ G03F 1/30 |
| | | 430/5 |
| 10,294,098 B2 | 5/2019 | Lin et al. |
| 11,198,606 B2 * | 12/2021 | Wang ................. B81C 1/00285 |
| 2014/0061930 A1 * | 3/2014 | Holmes .............. H01L 23/5226 |
| | | 257/769 |
| 2017/0210619 A1 * | 7/2017 | Chang ................. B81C 1/00269 |

OTHER PUBLICATIONS

Gorelick et al. "Air Damping of Oscillating MEMS Structures: Modeling and Comparison with Experiment" Excerpt From the Proceedings of the 2013 COMSOL Conference in Rotterdam. Published in 2013.

* cited by examiner

*Primary Examiner* — Nicholas J Tobergte
(74) *Attorney, Agent, or Firm* — Eschweiler & Potashnik, LLC

(57) ABSTRACT

The present disclosure relates to an integrated chip including a semiconductor device substrate and a plurality of semiconductor devices arranged along the semiconductor device substrate. A micro-electromechanical system (MEMS) layer overlies the semiconductor device substrate. The MEMS layer includes a first moveable mass and a second moveable mass. A capping layer overlies the MEMS layer. The capping layer has a first lower surface directly over the first moveable mass and a second lower surface directly over the second moveable mass. An outgas layer is on the first lower surface and directly between the first pair of sidewalls. A lower surface of the outgas layer delimits a first cavity in which the first moveable mass is arranged. The second lower surface of the capping layer delimits a second cavity in which the second moveable mass is arranged.

20 Claims, 21 Drawing Sheets

MICRO-ELECTROMECHANICAL SYSTEMS (MEMS) DEVICE WITH OUTGAS LAYER

BACKGROUND

Micro-electromechanical systems (MEMS) is a technology that integrates miniaturized mechanical and electromechanical elements on an integrated chip. MEMS devices are often made using micro-fabrication techniques. In recent years, MEMS devices have found a wide range of applications. For example, MEMS devices are found in cell phones (e.g., accelerometers, gyroscopes, digital compasses), pressure sensors, micro-fluidic elements (e.g., valves, pumps), optical switches (e.g., mirrors), etc. For many applications, MEMS devices are electrically connected to application-specific integrated circuits (ASICs), and to external circuitry, to form complete MEMS systems. Commonly, the connections are formed by wire bonding, but other approaches are also possible.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
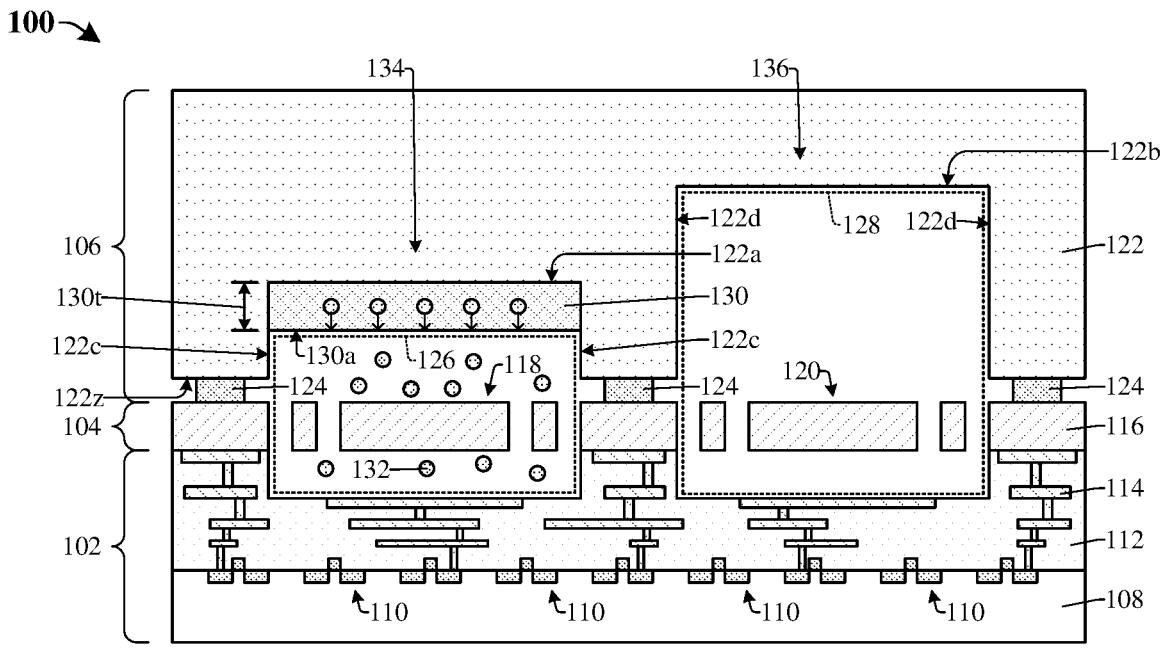
FIG. 1 illustrates a cross-sectional view of some embodiments of an integrated chip comprising a first moveable mass within a first cavity, a second moveable mass within a second cavity, and a first outgas layer arranged along the first cavity.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Many modern integrated chips include micro-electromechanical system (MEMS) devices. For example, an integrated chip includes a semiconductor device structure. The semiconductor device structure includes a plurality of semiconductor devices arranged along a semiconductor device substrate. A capping layer is arranged over the semiconductor device structure. A MEMS layer is arranged between the capping layer and the semiconductor device structure. A first capping recess in the capping layer and an underlying first device recess in the semiconductor device structure together form a first cavity. A second capping recess in the capping layer and an underlying second device recess in the semiconductor device structure together form a second cavity. The MEMS layer includes a first moveable mass arranged within the first cavity and a second moveable mass arranged within the second cavity. The first moveable mass and the first cavity form a first MEMS device (e.g., an accelerometer or the like) configured to detect linear movement. The second moveable mass and the second cavity form a second MEMS device (e.g., a gyroscope or the like) configured to detect rotational movement.

Forming the integrated chip includes a number of processes. For example, the MEMS layer is formed on the semiconductor device structure. The first moveable mass and the second moveable mass are formed along the MEMS layer. The capping layer is bonded to the MEMS layer to form the first and second cavities with the first and second moveable masses arranged therein.

A challenge with some of these MEMS devices is that the pressures of the first and second cavities may be approximately equal after the bonding, but oftentimes the first MEMS device has a different optimal operating pressure than the second MEMS device. For example, the first MEMS device may operate best (e.g., may have an improved performance) when the pressure in the first cavity is within a first range and the second MEMS device may operate best when the pressure is in the second range, different from the first range. However, because the pressures of the first and second cavities are approximately equal after the bonding, a performance of one or both of the first and second MEMS devices may be reduced.

Various embodiments of the present disclosure are related to an integrated chip comprising a first cavity and a second cavity, and a method for forming the integrated chip such that a pressure in the first cavity is substantially different from a pressure in the second cavity. The method includes forming a plurality of semiconductor devices are arranged along the semiconductor device substrate. A MEMS layer is formed over the semiconductor device substrate. A first moveable mass and a second moveable mass are formed along the MEMS layer. A first cap recess and a second cap recess are formed in a capping layer. The capping layer and the MEMS layer are bonded together to form a first cavity in which the first moveable mass is arranged and a second cavity in which the second moveable mass is arranged. The first moveable mass and the first cavity form a first MEMS device (e.g., an accelerometer or the like) configured to detect a first movement (e.g., linear movement). The second moveable mass and the second cavity form a second MEMS device (e.g., a gyroscope or the like) configured to detect a second movement (e.g., rotational movement).

The pressure in the first cavity may be approximately equal to the pressure in the second cavity after the bonding (e.g., the first and second cavities may both have a common base pressure after the bonding). The common base pressure in the first and second cavities may be low. In some instances, the common base pressure may be within an optimal pressure range for the second MEMS device, but may be lower than an optimal pressure range for the first MEMS device. Thus, an outgas layer is formed on the capping layer at the first cap recess but not at the second cap recess. The outgas layer may release an outgas species into the first cavity after the bonding (e.g., during a baking process performed after the bonding process), thereby increasing a pressure in the first cavity. Thus, by forming the outgas layer at the first cavity, a pressure in the first cavity may be increased. Further, by not forming the outgas layer at the second cavity, a pressure in the second cavity may be maintained. In other words, by forming the outgas layer at the first cavity and not at the second cavity, the first cavity pressure may be adjusted to a value that is within the optimal pressure range for the first MEMS device without disturbing the second cavity pressure (e.g., without changing the second cavity pressure such that it is no longer within the optimal pressure range for the second MEMS device). As a result, a performance of the first MEMS device may be improved without diminishing a performance of the second MEMS device.

FIG. 1 illustrates a cross-sectional view 100 of some embodiments of an integrated chip comprising a first moveable mass 118 within a first cavity 126, a second moveable mass 120 within a second cavity 128, and a first outgas layer 130 arranged along the first cavity 126.

The integrated chip comprises a semiconductor device structure 102, a MEMS structure 104 directly over the semiconductor device structure 102, and a capping structure 106 directly over the MEMS structure 104. The semiconductor device structure 102 comprises a semiconductor device substrate 108 and a plurality of semiconductor devices 110 arranged along the semiconductor device substrate 108. A device dielectric structure 112 comprising one or more dielectric layers is disposed over the semiconductor device substrate 108. A plurality of conductive features 114 (e.g., conductive wires, metal lines, metal vias, bond pads, contacts, etc.) are arranged within the device dielectric structure 112. The MEMS structure 104 comprises a MEMS layer 116. The MEMS layer 116 comprises a first moveable mass 118 and a second moveable mass 120 laterally spaced apart from the first moveable mass 118.

The capping structure 106 comprises a capping layer 122 and a bonding layer 124. The capping layer 106 has a first lower surface 122a and a first pair of sidewalls 122c on opposite sides of the first lower surface 122a. The first lower surface 122a is directly over the first moveable mass 118. The first lower surface 122a and the first pair of sidewalls 122c delimit a first cap recess in the capping layer 122. In addition, the capping layer 106 has a second lower surface 122b above the first lower surface 122a and a second pair of sidewalls 122d on opposite sides of the second lower surface 122b. The second lower surface 122b is directly over the second moveable mass 120. The second lower surface 122b and the second pair of sidewalls 122d delimit a second cap recess in the capping layer 122. The capping structure 106 further comprises the first outgas layer 130. The first outgas layer 130 is arranged on the first lower surface 122a of the capping layer 122 and directly between the first pair of sidewalls 122c of the capping layer 122. In some embodiments, the first outgas layer 130 may, for example, comprise silicon dioxide, aluminum oxide, or some other suitable material. In some embodiments, the second lower surface 122b of the capping layer 122 is devoid of the first outgas layer 130.

A first cavity 126 and a second cavity 128 are within the integrated chip. In some embodiments, a lower surface 130a of the first outgas layer 130, the first pair of sidewalls 122c of the capping layer 122, portions of the MEMS layer 116, portions of the device dielectric structure 112, and one or more of the conductive features 114 delimit the first cavity 126. In some embodiments, the second lower surface 122b of the capping layer 122, the second pair of sidewalls 122d of the capping layer 122, portions of the MEMS layer 116, portions of the device dielectric structure 112, and one or more of the conductive features 114 delimit the second cavity 128. The first moveable mass 118 is arranged within the first cavity 126 and is configured to move about the first cavity 126. The second moveable mass 120 is arranged within the second cavity 128 and is configured to move about the second cavity 128.

The integrated chip includes a first MEMS device 134 (e.g., an accelerometer or the like) configured to detect a movement of the first moveable mass 118 and a second MEMS device 136 (e.g., a gyroscope or the like) configured to detect a movement of the second moveable mass 120. The first MEMS device 134 has a first optimal pressure range at which it is configured to operate and the second MEMS device 136 has a second optimal pressure range at which it is configured to operate. For example, a performance of the first MEMS device 134 may be improved when the pressure in the first cavity 126 is within the first optimal pressure range and a performance of the second MEMS device 136 may be improved when the pressure in the second cavity 128 is within the second optimal pressure range. In some embodiments, the first optimal pressure range is substantially different (e.g., different by a 75 millibar or more) from the second optimal pressure range. For example, in some embodiments, the first optimal pressure range is about 100 to 300 millibar, 150 to 250 millibar, greater than 200 millibar, or some other suitable range, and the second optimal pressure range is about 1 to 10 millibar, 3 to 6 millibar, less than 10 millibar, or some other suitable range.

In some instances, a common base pressure in the first cavity 126 and the second cavity 128 (e.g., after the capping structure 106 is bonded to the MEMS structure 104) may be within the second optimal pressure range but not the within the first optimal pressure range. By including the first outgas layer 130 on the capping layer 122 at the first cavity 126, a pressure in the first cavity 126 may be increased. For example, the first outgas layer 130 is configured to release an outgas species 132 (e.g., argon gas, hydrogen gas, oxygen gas, carbon dioxide gas, or the like) into the first cavity 126 during a baking process performed after the capping structure 106 is bonded to the MEMS structure 104. The release of the outgas species 132 into the first cavity 126 causes an increase in the pressure in the first cavity 126. Thus, the pressure in the first cavity 126 can be increased from the common base pressure to a value that is within the first optimal pressure range. As a result, a performance of the first MEMS device 134 can be improved.

Further, by not forming the first outgas layer 130 at the second cavity 128, the pressure in the second cavity 128 may be maintained after the bonding. For example, in some instances where the common base pressure after bonding is within the second optimal pressure range, increasing the pressure in the second cavity 128 may cause the pressure in the second cavity 128 to be greater than the second optimal pressure range and hence may reduce a performance of the second MEMS device 136. Thus, in such instances, by not including the first outgas layer 130 at the second cavity 128, the pressure in the second cavity 128 may be maintained (e.g., may be kept within the second optimal pressure range).

Thus, by including the first outgas layer 130 at the first cavity 126 but not at the second cavity 128, a performance of the first MEMS device 134 may be improved without diminishing a performance of the second MEMS device 136.

In some embodiments, a thickness 130t of the first outgas layer 130 is less than a distance between the first lower surface 122a of the capping layer 122 and a bottom surface 122z of the capping layer 122. In some embodiments, the pressure in the first cavity 126 can be controlled by controlling the thickness 130t of the first outgas layer 130. For example, the thickness 130t of the first outgas layer 130 can determine the amount of outgas species 132 that the first outgas layer 130 can release into the first cavity 126 during the baking process, and hence the thickness of the first outgas layer 130 can correspond to the pressure in the first cavity 126. Thus, by controlling the thickness of the first outgas layer 130, a pressure in the first cavity 126 can be controlled. In some embodiments, the thickness 130t of the first outgas layer 130 is proportional to the pressure in the first cavity 126.

Figure 2:
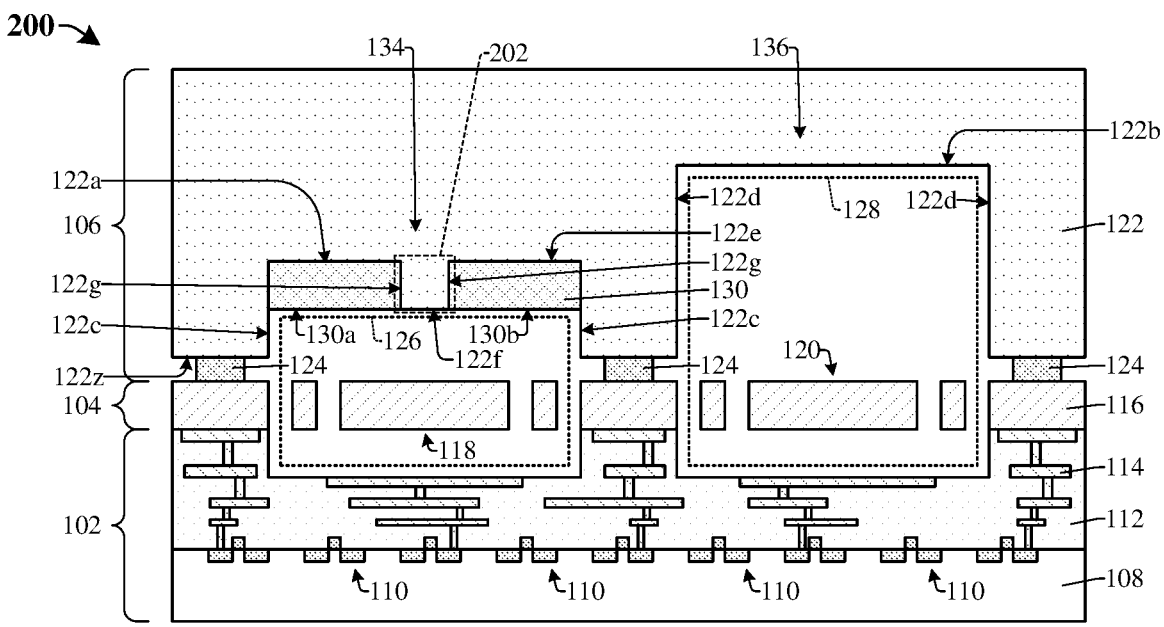
FIGS. 2-8 illustrate cross-sectional views of some embodiments of the integrated chip of FIG. 1 in which a capping layer includes a first protrusion at the first cavity.

FIG. 2 illustrates a cross-sectional view 200 of some embodiments of the integrated chip of FIG. 1 in which the capping layer 122 includes a first protrusion 202 at the first cavity 126.

The capping layer 122 has the first lower surface 122a and a third lower surface 122e. In some embodiments, the first lower surface 122a and a third lower surface 122e are approximately coplanar (e.g., the first lower surface 122a and the third lower surface 122e are disposed at a same height over the device substrate 108). The first protrusion 202 is arranged between the first lower surface 122a and the third lower surface 122e. The first protrusion 202 is directly over the first moveable mass 118. The first protrusion 202 delimited by a third pair of sidewalls 122g of the capping layer 122 and a fourth lower surface 122f of the capping layer 122. The third pair of sidewalls 122g and the fourth lower surface 122f are directly between the first pair of sidewalls 122c of the capping layer 122. The fourth lower surface 122f is below the first lower surface 122a and the third lower surface 122e of the capping layer 122. In some embodiments, the fourth lower surface 122f of the capping layer 122 further delimits the first cavity 126. In some embodiments, the first protrusion 202 is a stopper configured to stop the first moveable mass 118 from colliding with other portions of the capping layer 122.

The first outgas layer 130 is disposed on the third pair of sidewalls 122g of the capping layer 122. In some embodiments, the first outgas layer 130 has the first lower surface 130a and a second lower surface 130b on opposite sides of the first protrusion 202. In some embodiments, the first lower surface 130a of the first outgas layer 130, second lower surface 130b of the first outgas layer 130, and the fourth lower surface 122f of the capping layer 122 are approximately coplanar.

In some embodiments, a width (e.g., along a lateral direction) of the first protrusion 202 may, for example, be about 1 micrometer to 3 micrometers, about 2 micrometers to about 6 micrometers, or some other suitable value. In some embodiments, a length (e.g., into the page) of the first protrusion 202 may, for example, be about 1 micrometer to 3 micrometers, about 2 micrometers to about 6 micrometers, or some other suitable value. In some embodiments, a depth (e.g., along a vertical direction) of the first protrusion 202 is less than a distance between the first lower surface 122a of the capping layer 122 and the bottom surface 122z of the capping layer 122. For example, in some embodiments, the depth of the first protrusion 202 may be about 5 micrometers to 35 micrometers, about 10 micrometers to about 30 micrometers, or some other suitable value.

Although lower surfaces 122a, 122e of the capping layer 122 are labeled separately, in some embodiments, lower surfaces 122a, 122e may be collectively referred to as the first lower surface of the capping layer 122. Similarly, although lower surfaces 130a, 130b of the first outgas layer 130 are labeled separately, in some embodiments, lower surfaces 130a, 130b may be collectively referred to as the first lower surface of the first outgas layer 130.

FIGS. 3-8 illustrate cross-sectional views 300-800 of some other embodiments of the integrated chip of FIG. 1 in which the capping layer 122 includes a first protrusion 202 at the first cavity 126.

Figure 3:
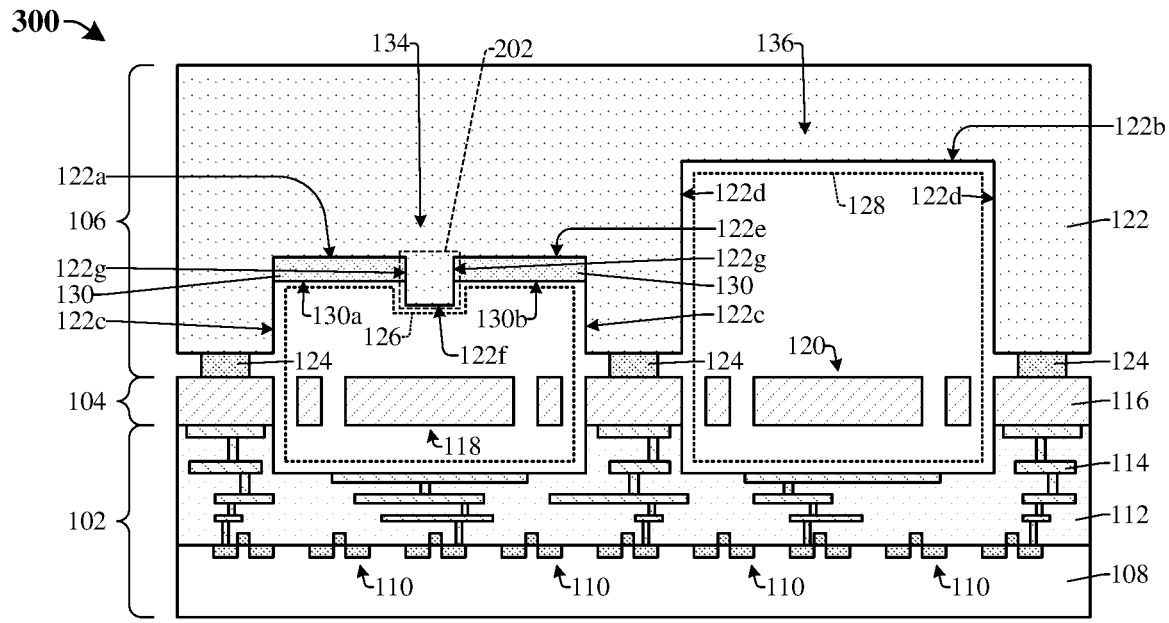

In some embodiments (e.g., as illustrated in FIG. 3), a bottom of the first outgas layer 130 is above a bottom of the first protrusion 202. For example, the first lower surface 130a and the second lower surface 130b of the first outgas layer 130 are above the fourth lower surface 122f of the capping layer 122. The third pair of sidewalls 122g of the capping layer 122 further delimit the first cavity 126.

Figure 4:
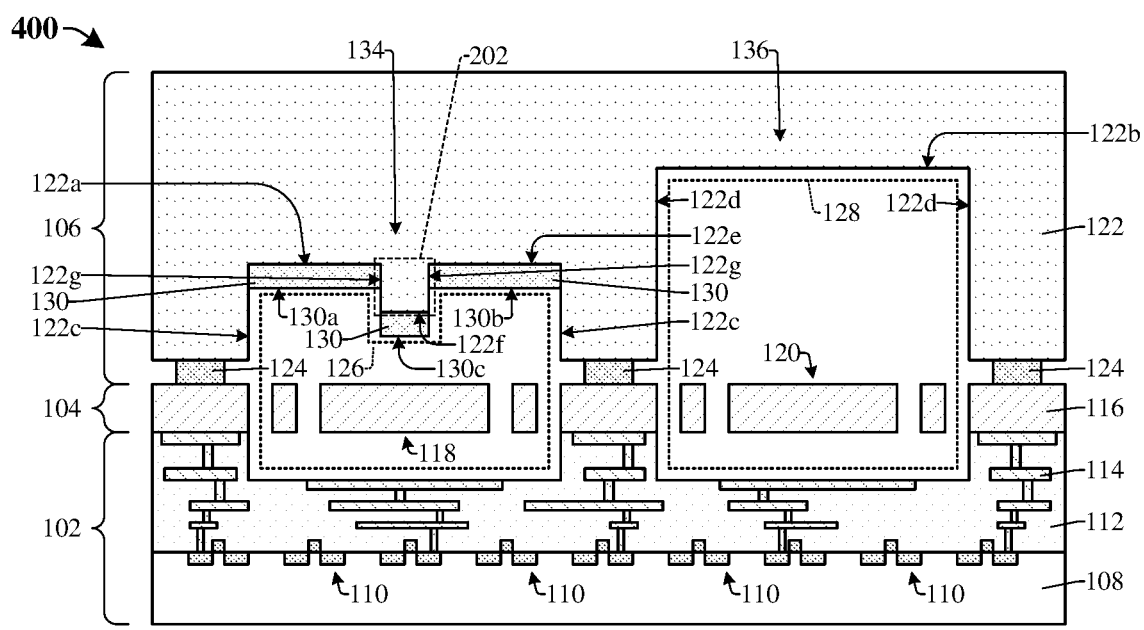
Figure 5:
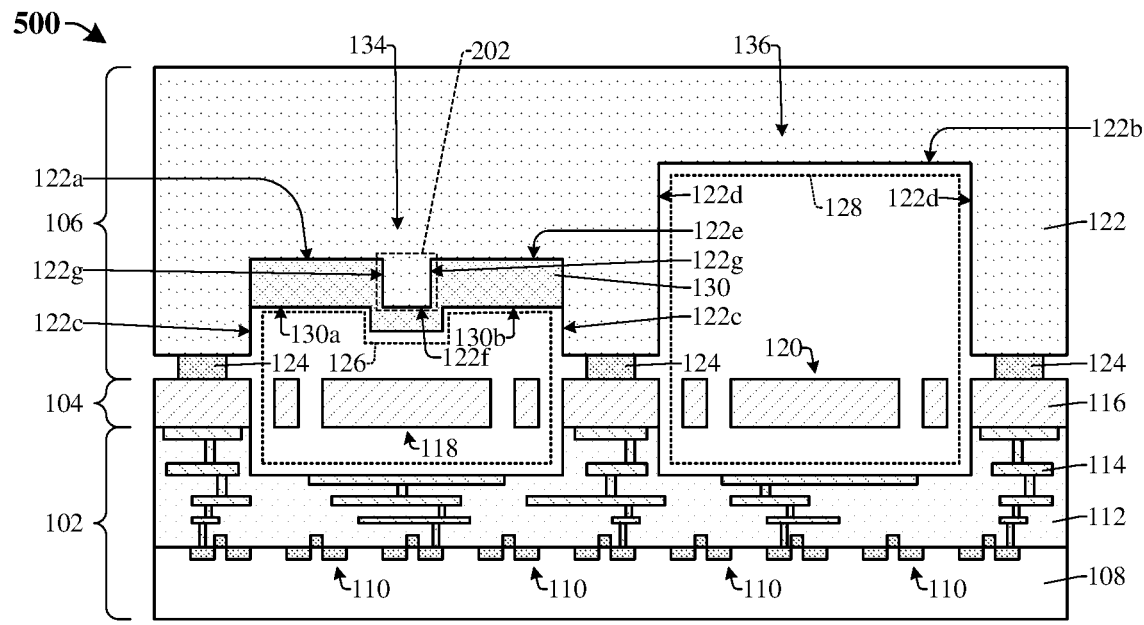

In some embodiments (e.g., as illustrated in FIG. 4 and FIG. 5), the first outgas layer 130 is arranged on the bottom of the first protrusion 202. For example, the first outgas layer 130 is arranged on the fourth lower surface 122f of the capping layer 122. The first outgas layer 130 has a third lower surface 130c below the first lower surface 130a and the second lower surface 130b. The third lower surface 130c and sidewalls (not labeled) of the first outgas layer 130 further delimit the first cavity 126. In some embodiments (e.g., as illustrated in FIG. 4), portions of the third pair of sidewalls 122g of the capping layer 122 are devoid of the first outgas layer 130. In some other embodiments (e.g., as illustrated in FIG. 5), the first outgas layer 130 extends along the third pair of sidewalls 122g of the capping layer 122 from tops to bottoms of the third pair of sidewalls 122g.

Figure 6:
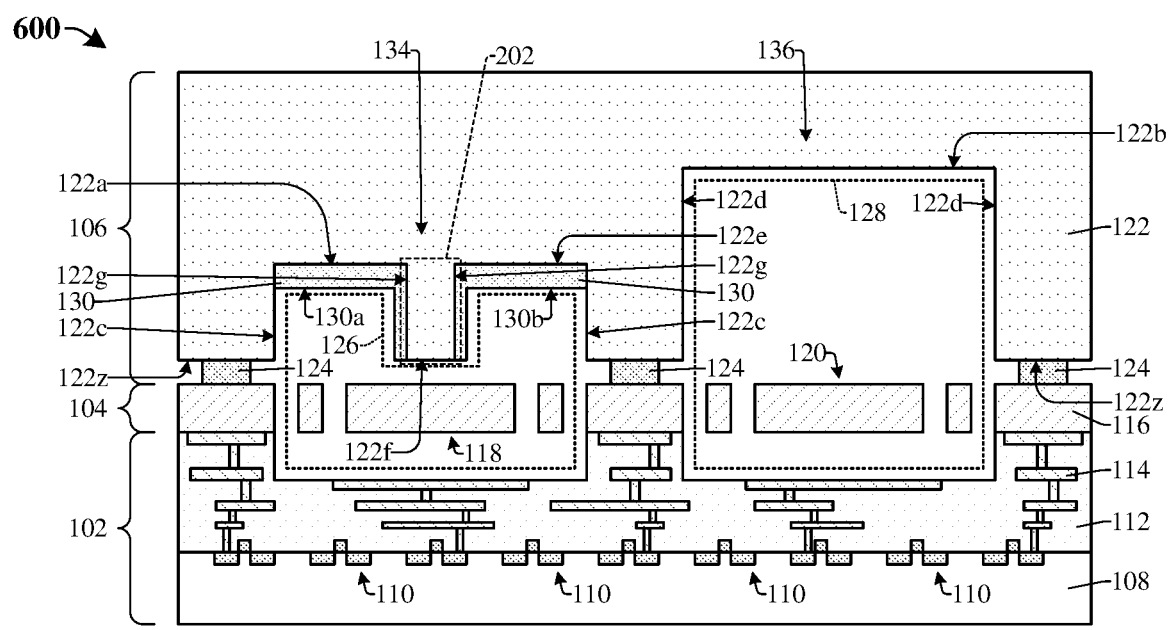

In some embodiments (e.g., as illustrated in FIG. 6), the first outgas layer 130 is arranged on first lower surface 122a, the third lower surface 122e, and the third pair of sidewalls 122g of the capping layer 122 in L-shaped segments. In some embodiments, the first outgas layer 130 is not disposed on the fourth lower surface 122f of the capping layer 122. In some embodiments, the fourth lower surface 122f of the capping layer 122 and a bottom surface 122z of the capping layer 122 are approximately coplanar.

Figure 7:
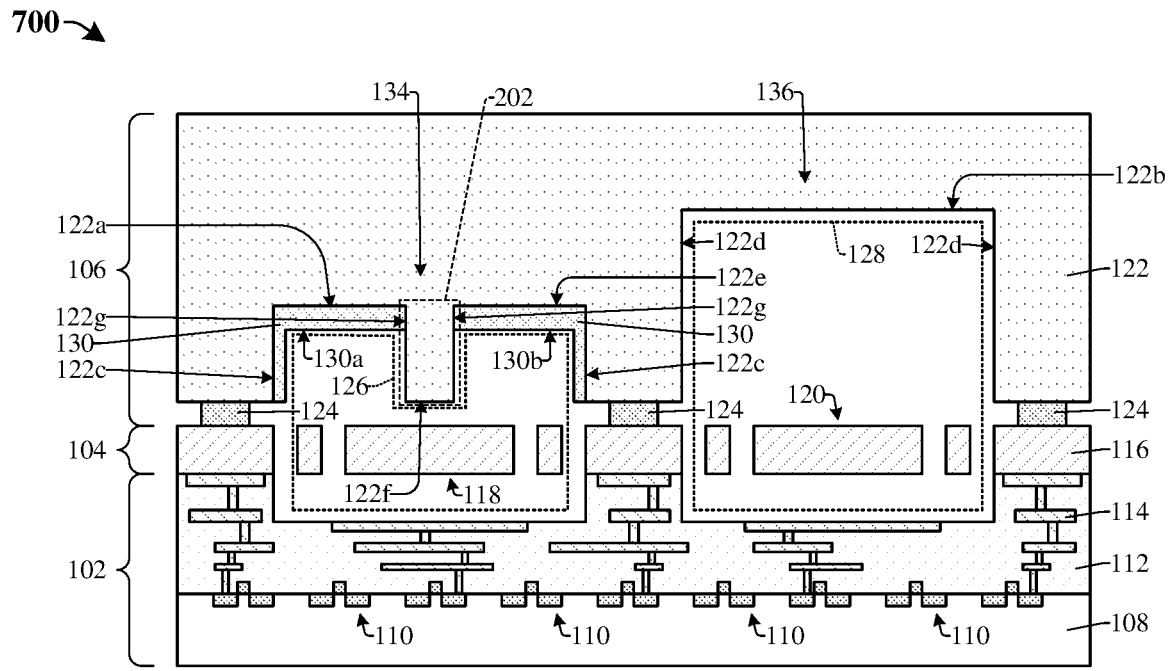

In some embodiments (e.g., as illustrated in FIG. 7), the first outgas layer 130 is arranged on first lower surface 122a, the third lower surface 122e, and the first pair of sidewalls 122c of the capping layer 122 in L-shaped segments.

Figure 8:
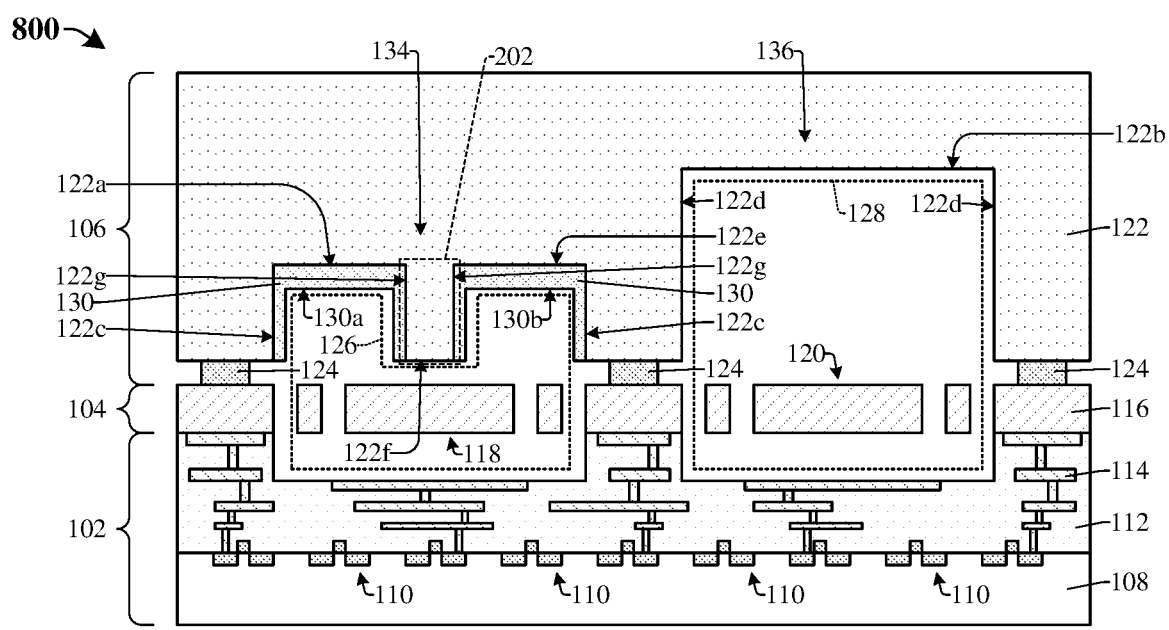

In some embodiments (e.g., as illustrated in FIG. 8), the first outgas layer 130 is arranged on first lower surface 122a, the third lower surface 122e, the first pair of sidewalls 122c, and the third pair of sidewalls 122g of the capping layer 122 in U-shaped segments.

Figure 9:
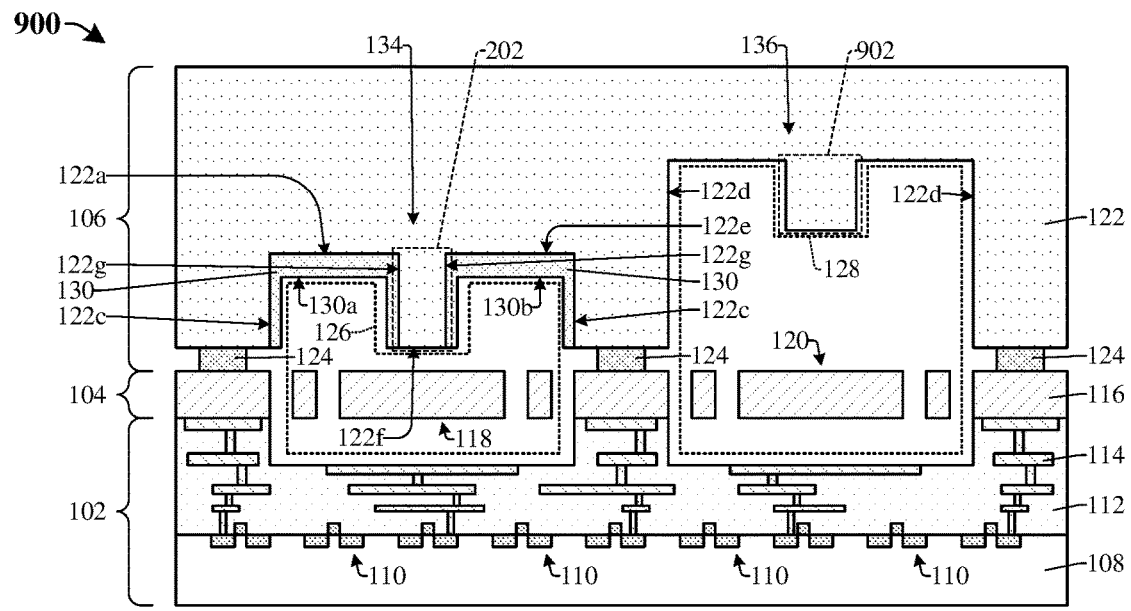
FIG. 9 illustrates a cross-sectional view of some embodiments of the integrated chip of FIG. 8 in which the capping layer further includes a second protrusion at the second cavity.

FIG. 9 illustrates a cross-sectional view 900 of some embodiments of the integrated chip of FIG. 8 in which the capping layer 122 further includes a second protrusion 902 at the second cavity 128.

The second protrusion 902 further delimits the second cavity 128. The second protrusion 902 is disposed directly over the second moveable mass 120 and directly between the second pair of sidewalls 122d of the capping layer 122. The second protrusion 902 is delimited by sidewalls (not labeled) and a lower surface (not labeled) of the capping layer 122. In some embodiments, the second protrusion 902 is a stopper configured to stop the second moveable mass 120 from colliding with other portions of the capping layer 122.

Figure 10:
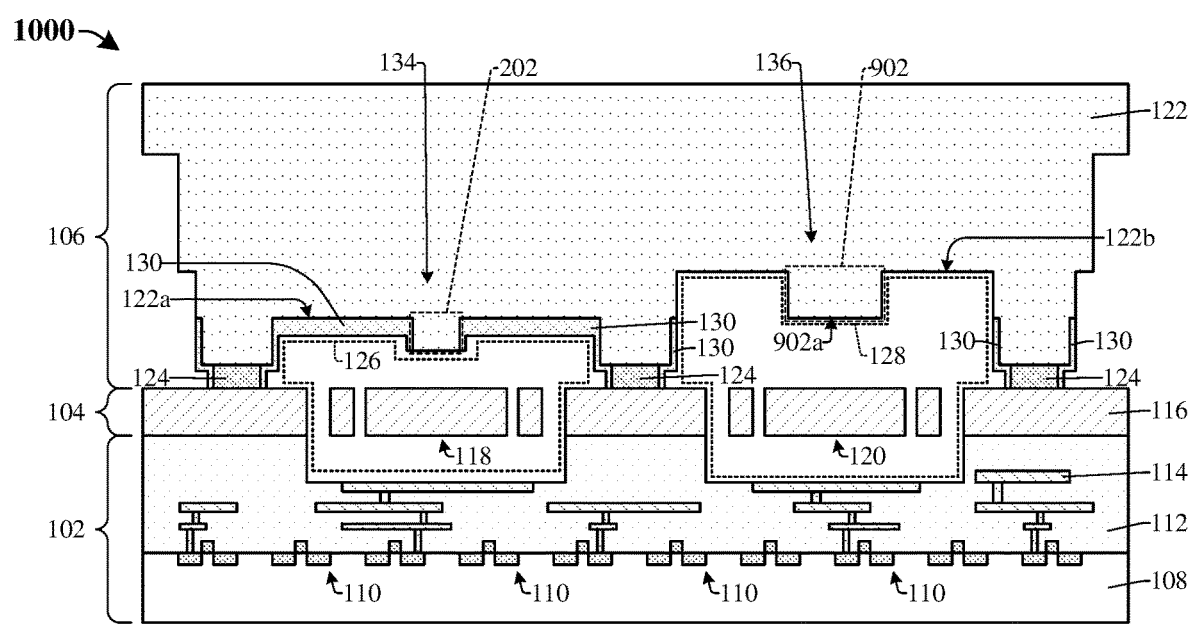
FIG. 10 illustrates a cross-sectional view of some other embodiments of an integrated chip in which the capping layer includes a second protrusion at the second cavity.

FIG. 10 illustrates a cross-sectional view 1000 of some other embodiments of an integrated chip in which the capping layer 122 includes a second protrusion 902 at the second cavity 128.

In some embodiments, the first outgas layer 130 is disposed on sidewalls of the bonding layer 124. In some embodiments, portions of the first outgas layer 130 are disposed on sidewalls of the capping layer 122 that extend along the second cavity 128. In some embodiments, a bottom surface 902a of the second protrusion 902 is approximately coplanar with the first lower surface 122a of the capping layer 122 (e.g., the bottom surface 902a of the second protrusion 902 and the first lower surface 122a of the capping layer 122 are disposed at a same height).

Figure 11:
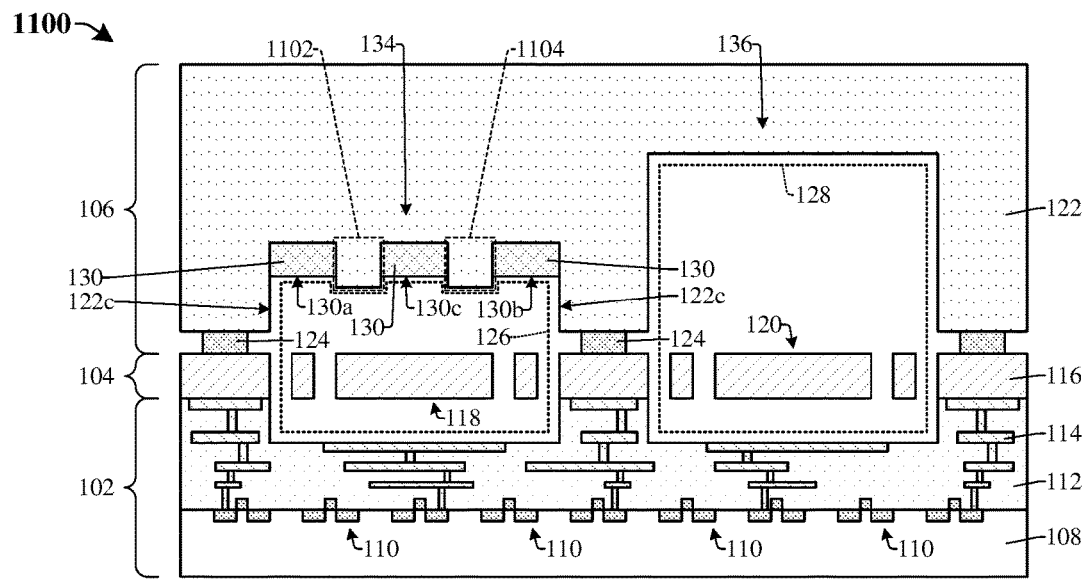
FIG. 11 illustrates a cross-sectional view of some embodiments of the integrated chip of FIG. 1 in which the capping layer includes both a first protrusion and a second protrusion at the first cavity.

FIG. 11 illustrates a cross-sectional view 1100 of some embodiments of the integrated chip of FIG. 1 in which the capping layer 122 includes both a first protrusion 1102 and a second protrusion 1104 at the first cavity 126.

The first protrusion 1102 and the second protrusion 1104 are disposed directly over the first moveable mass 118 and directly between the first pair of sidewalls 122c of the capping layer 122. The first outgas layer 130 is disposed between the first protrusion 1102 and the second protrusion 1104 and on opposite sides of the first protrusion 1102 and the second protrusion 1104. In some embodiments, the first cavity 126 is delimited by a first lower surface 130a of the first outgas layer 130, a second lower surface 130b of the first outgas layer 130, and a third lower surface 130c of the first outgas layer 130, sidewalls (not labeled) and a lower surface (not labeled) of the capping layer 122 that delimit the first protrusion 1102, and sidewalls (not labeled) and a lower surface (not labeled) of the capping layer 122 that delimit the second protrusion 1104.

Figure 12:
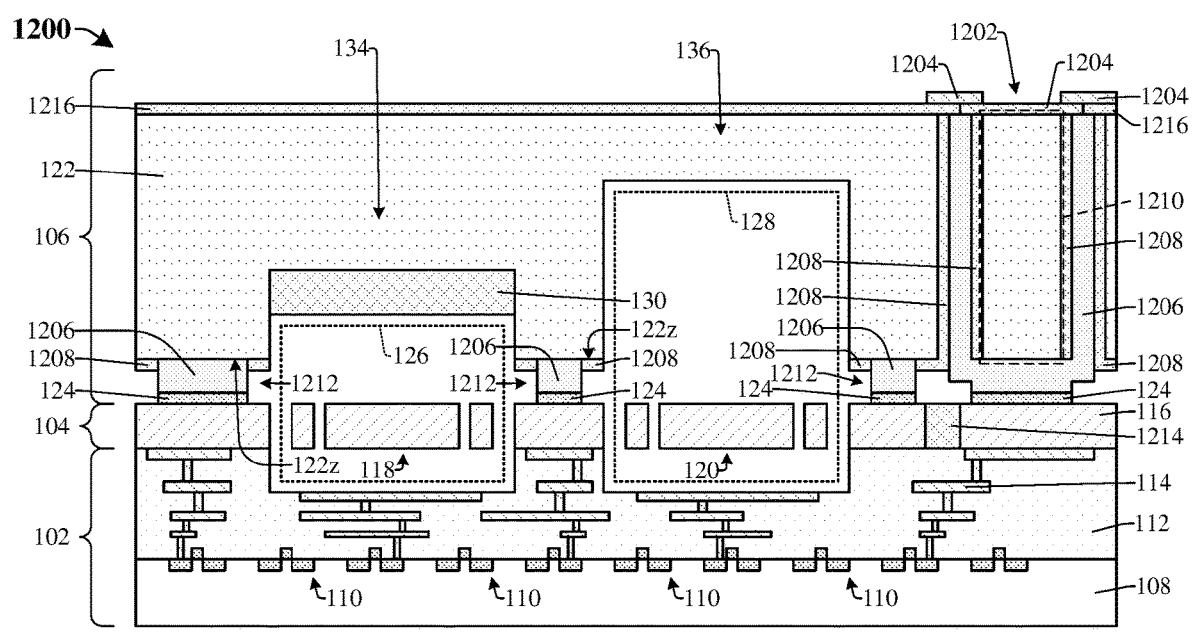
FIG. 12 illustrates a cross-sectional view of some embodiments of the integrated chip of FIG. 1 further comprising a conductive pillar structure.

FIG. 12 illustrates a cross-sectional view 1200 of some embodiments of the integrated chip of FIG. 1 in which a portion of the MEMS layer 116 is coupled to conductive features 1204 disposed over the capping layer 122 by a conductive pillar structure 1202.

The conductive pillar structure 1202 includes a pillar portion 1210 of the capping layer 122 and a conductive layer 1206. The conductive layer 1206 is disposed vertically between the bonding layer 124 and the pillar portion 1210 of the capping layer 122. At the conductive pillar structure 1202, the conductive layer 1206, the pillar portion 1210 of the capping layer 122, and the bonding layer 124 electrically couple a portion of the MEMS layer 116 to the conductive features 1204 disposed over the capping layer 122. At the conductive pillar structure 1202, the conductive layer 1206 and the pillar portion 1210 of the capping layer 122 are electrically isolated from other portions of the capping layer 122 by a first isolation layer 1208. The first isolation layer 1208 extends along the bottom surface 122z of the capping layer 122 and along sidewalls of the capping layer 122 (e.g., at the pillar structure 1202). A second isolation layer 1216 extends along a top of the capping layer 122. At bond ring structures 1212, portions of the conductive layer 1206 are disposed vertically between the bonding layer 124 and the capping layer 122. In some embodiments, the portion of the MEMS layer 116 that is coupled to the pillar structure 1202 is isolated from other portions of the MEMS layer 116 by a dielectric layer 1214.

In some embodiments, a distance between the first lower surface 122a of the capping layer 122 and the bottom surface 122z of the capping layer 122 is less a distance between the second lower surface 122b of the capping layer 122 and the bottom surface 122z of the capping layer 122. In some embodiments, a distance between the first pair of sidewalls 122c of the capping layer 122 is less than a distance between the second pair of sidewalls 122d of the capping layer 122. In some embodiments, a length (e.g., along a direction that extends into the page) of the first lower surface 122a of the capping layer 122 is less than a length of the second lower surface 122b of the capping layer 122.

In some embodiments, a thickness (e.g., along a vertical direction) of the first outgas layer 130 is about 1 micrometer to 10 micrometers, about 2 micrometers to 8 micrometers, or some other suitable thickness. In some embodiments, a width (e.g., along a lateral direction) of the first outgas layer 130 is approximately equal to the distance between the first pair of sidewalls 122c of the capping layer 122, less than the distance between the first pair of sidewalls 122c of the capping layer 122, or some other suitable width. In some embodiments, a length (e.g., along a direction that extends into the page) of the first outgas layer 130 is approximately equal to the length of the first lower surface 122a of the capping layer 122, less than the length of the first lower surface 122a of the capping layer 122, or some other suitable length.

Figure 13:
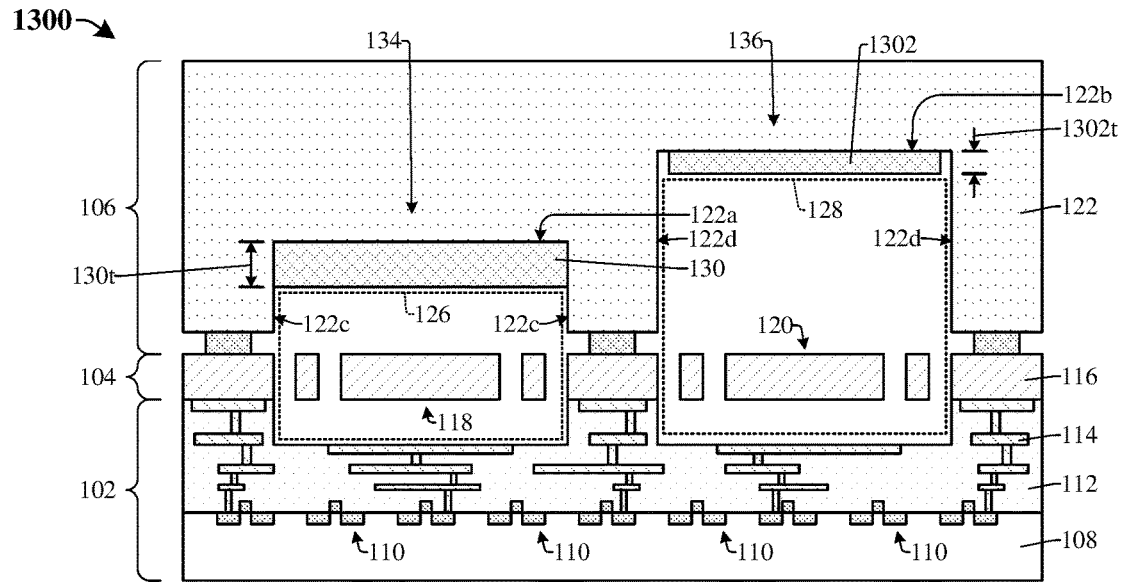
FIG. 13 illustrates a cross-sectional view of some embodiments of the integrated chip of FIG. 1 in which a second outgas layer is arranged along the second cavity.

FIG. 13 illustrates a cross-sectional view 1300 of some embodiments of the integrated chip of FIG. 1 in which a second outgas layer 1302 is arranged along the second cavity 128.

For example, the second outgas layer 1302 is arranged on the second lower surface 122b of the capping layer 122 and directly between the second pair of sidewalls 122d of the capping layer 122. The second outgas layer 1302 further delimits the second cavity 128. The second outgas layer 1302 is configured to release a second outgas species into the second cavity 128. In some embodiments, the second outgas layer 1302 is spaced apart from the second pair of sidewalls 122d of the capping layer 122. In some other embodiments, the second outgas layer 1302 is on and extends between the second pair of sidewalls 122d of the capping layer 122.

In some embodiments, the first outgas layer 130 and the second outgas layer 1302 are included in the integrated chip because the common base pressure in the first cavity 126 and the second cavity 128 after the capping structure 106 is bonded to the MEMS structure 104 is below the first optimal pressure range for the first MEMS device 134 and below the second optimal range for the second MEMS device 136. Thus, by including the first outgas layer 130 at the first cavity 126 and the second outgas layer 1302 at the second cavity 128, the pressures in the first cavity 126 and the second cavity 128 may be increased to values within the first optimal range and the second optimal range, respectively. As a result, a performance of the first MEMS device 134 and a performance of the second MEMS device 136 may be improved.

In some embodiments, the first outgas layer 130 and the second outgas layer 1302 comprise a first dielectric (e.g., silicon dioxide, aluminum oxide, or some other suitable material). In some embodiments, a thickness 1302t of the second outgas layer 1302 is different from a thickness 130t of the first outgas layer 130. By controlling the thicknesses of the first outgas layer 130 and the second outgas layer 1302, the pressures of the first cavity 126 and the second cavity 128 may be tuned to the individual optimal ranges for the first MEMS device and the second MEMS device 136, respectively. For example, in some embodiments, the thickness 130t of the first outgas layer 130 is greater than the thickness 1302t of the second outgas layer 1302 because the first optimal pressure range of the first MEMS device 134 is greater than the second optimal pressure range of the second MEMS device 136. Thus, by controlling the thickness 130t of the first outgas layer 130 to be greater than the thickness 1302t of the second outgas layer 1302, the amount of outgas species that can be released into the first cavity 126 from the first outgas layer 130 is greater than the amount of outgas species that can be released into the second cavity 128 from the second outgas layer 1302. As a result, the first cavity 126 may experience a greater increase in pressure than the second cavity 128 after the bonding and baking processes are performed. In other words, the pressure in the first cavity 126 and the pressure in the second cavity 128 may be individually adjusted by controlling the individual thicknesses of the first outgas layer 130 and the second outgas layers 1302, respectively.

Additionally, or alternatively, in some embodiments, the first outgas layer 130 comprises a first dielectric and the second outgas layer 1302 comprises a second dielectric, different from the first dielectric. For example, the first outgas layer 130 may comprise silicon dioxide, aluminum oxide, or some other suitable material and the second outgas layer 1302 may comprise an organic material (e.g., a carbon-containing material comprising oxygen, hydrogen, or any combination of the foregoing) or some other suitable material. In some instances, by controlling the first and second dielectrics, the pressure in the first cavity and the pressure in the second cavity 128 may be individually controlled. For example, one dielectric material may have different outgassing properties (e.g., different outgas species, different outgas rates, etc.) than another dielectric material, and hence the pressures in the first cavity 126 and the second cavity 128 may be controlled by controlling the dielectric materials of the first outgas layer 130 and the second outgas layer 1302, respectively.

In some embodiments, the device substrate 108 may, for example, comprise silicon or some other suitable semiconductor. In some embodiments, the semiconductor devices 110 may, for example, be or comprise bipolar junction transistors, metal-oxide-semiconductor field effect transistors, junction field effect transistors, fin field effect transistors, gate-all-around field effect transistors, or some other suitable semiconductor device(s). In some embodiments, the dielectric layer(s) of the device dielectric structure 112 may, for example, comprise silicon dioxide, silicon nitrides, silicon carbide, or some other suitable dielectric(s). In some embodiments, the conductive features 114 may, for example, comprise tungsten, copper, aluminum, gold, titanium, tantalum, ruthenium, molybdenum, or some other suitable material.

In some embodiments, the MEMS layer 116 may, for example, comprise silicon, some other suitable semiconductor, or some other suitable material. In some embodiments, the dielectric layer (e.g., 1214 of FIG. 12) may, for example, comprise silicon dioxide, silicon nitride, or some other suitable dielectric.

In some embodiments, the capping layer 122 may, for example, comprise silicon, some other suitable semiconductor, or some other suitable material. In some embodiments, the bonding layer 124 may, for example, comprise germanium or some other suitable bonding material. In some embodiments, the conductive layer (e.g., 1206 of FIG. 12) may, for example, comprise polysilicon or some other suitable material. In some embodiments, the first isolation layer (e.g., 1208 of FIG. 12) and/or the second isolation layer (e.g., 1216 of FIG. 12) may, for example, comprise silicon dioxide or some other suitable material. In some embodiments, the conductive features (e.g., 1204 of FIG. 12) may, for example, comprise titanium, titanium nitride, copper, aluminum, gold, or some other suitable material.

FIGS. 14-32 illustrate cross-sectional views 1400-3200 of some embodiments of a method for forming an integrated chip comprising a first moveable mass 118 within a first cavity 126, a second moveable mass 120 within a second cavity 128, and a first outgas layer 130 arranged along the first cavity 126. Although FIGS. 14-32 are described in relation to a method, it will be appreciated that the structures disclosed in FIGS. 14-32 are not limited to such a method, but instead may stand alone as structures independent of the method.

FIGS. 14-18 illustrate cross-sectional views 1400-1800 of some embodiments of a method for forming a semiconductor device structure 102 and a MEMS structure 104 directly over the semiconductor device structure 102.

Figure 14:
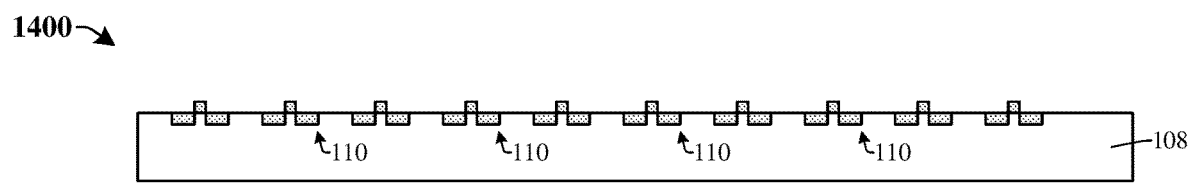
FIGS. 14-32 illustrate cross-sectional views of some embodiments of a method for forming an integrated chip comprising a first moveable mass within a first cavity, a second moveable mass within a second cavity, and a first outgas layer arranged along the first cavity.

As shown in cross-sectional view 1400 of FIG. 14, a plurality of semiconductor devices 110 are formed along a semiconductor device substrate 108.

Figure 15:
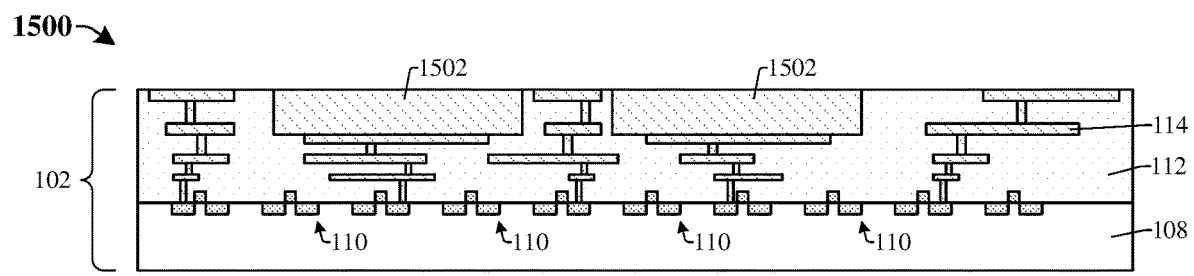

As shown in cross-sectional view 1500 of FIG. 15, a device dielectric structure 112 comprising one or more dielectric layers is formed over the device substrate 108 and a plurality of conductive features 114 are formed within the dielectric structure 112. In some embodiments, a sacrificial layer 1502 is formed along the dielectric structure 112 and between sidewalls of the dielectric structure 112. In some embodiments, the sacrificial layer 1502 may comprise silicon dioxide, silicon nitride, or some other suitable material and may be deposited by a chemical vapor deposition (CVD) process, a physical vapor deposition (PVD) process, an atomic layer deposition (ALD) process, or some other suitable process.

Figure 16:
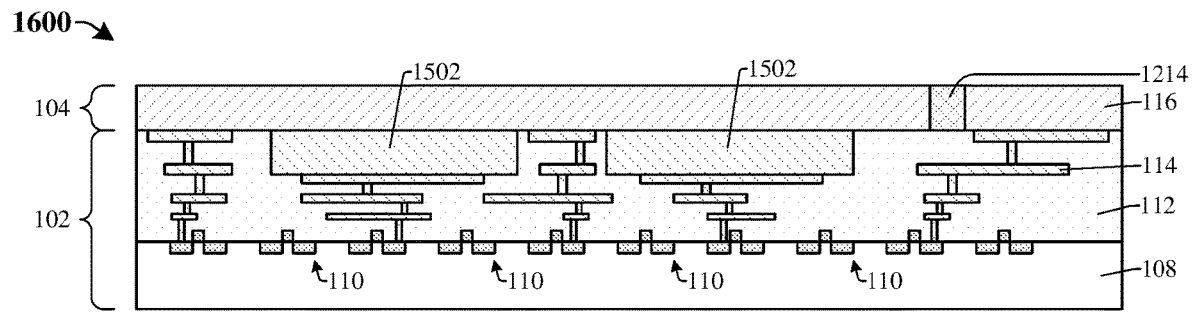

As shown in cross-sectional view 1600 of FIG. 16, a MEMS layer 116 is deposited over the dielectric structure 112 and over the sacrificial layer 1502. In some embodiments, a dielectric layer 1214 is formed between portions of the MEMS layer 116 along a periphery of the MEMS layer 116. In some embodiments, the MEMS layer 116 comprises silicon or some other suitable material and may be deposited by a CVD process, a PVD process, an ALD process, or some other suitable process.

Figure 17:
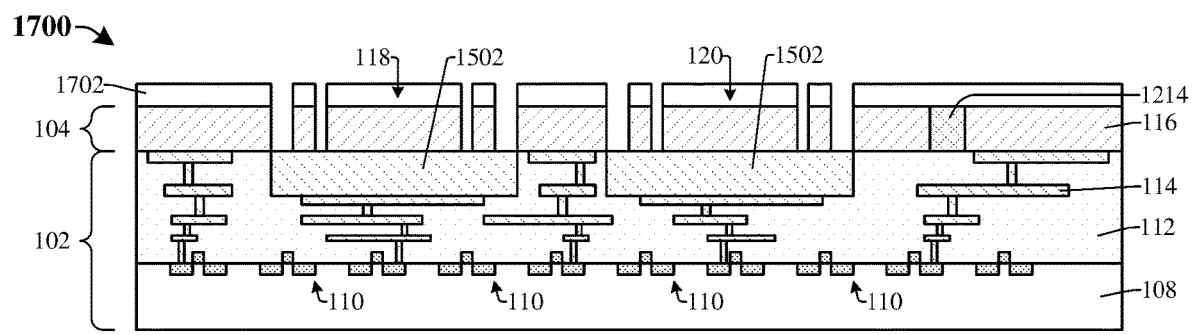

As shown in cross-sectional view 1700 of FIG. 17, the MEMS layer 116 is patterned to form a first moveable mass 118 and a second moveable mass 120 along the MEMS layer 116. In some embodiments, the patterning comprises forming a masking layer 1702 over the MEMS layer 116 and etching the MEMS layer 116 according to the masking layer 1702. In some embodiments, the etching comprises a dry etching process such as, for example, a plasma etching process, a reactive ion etching process, or some other suitable process. The masking layer 1702 may, for example, comprise photoresist or some other suitable material. The masking layer 1702 may be removed during and/or after the etching.

Figure 18:
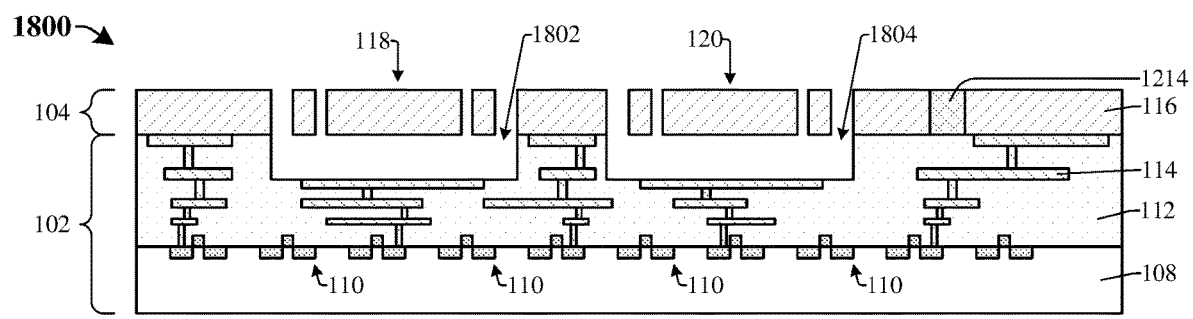

As shown in cross-sectional view 1800 of FIG. 18, the sacrificial layer (e.g., 1502 of FIG. 17) is removed, thereby leaving a first device recess 1802 directly below the first moveable mass 118 and a second device recess 1804 directly below the second moveable mass 120. In some embodiments, the sacrificial layer is removed by an etching process or some other suitable process.

FIGS. 19-32 illustrate cross-sectional views 1900-3200 of some embodiments of a method for forming a capping structure 106 and bonding the capping structure 106 to the MEMS structure 104.

Figure 19:
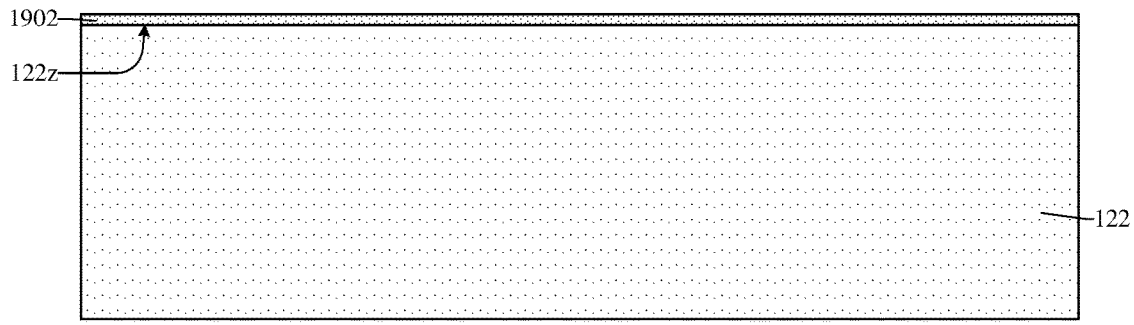

As shown in cross-sectional view 1900 of FIG. 19, a dielectric layer 1902 is deposited on a bottom surface 122z of a capping layer 122. In some embodiments, the capping layer 122 comprises silicon, or some other suitable material. In some embodiments, the dielectric layer 1902 comprises silicon nitride or some other suitable material and may be deposited by a CVD process, a PVD process, an ALD process, or some other suitable process.

Although surface 122z of the capping layer 122 appears to be the top surface (instead of the bottom surface) of the capping layer 122 as illustrated in FIG. 19, surface 122z is referred to as the bottom surface of the capping layer 122 because the capping layer 122 will subsequently be inverted such that surface 122z will be the bottom surface (see, for example, FIG. 31).

Figure 20:
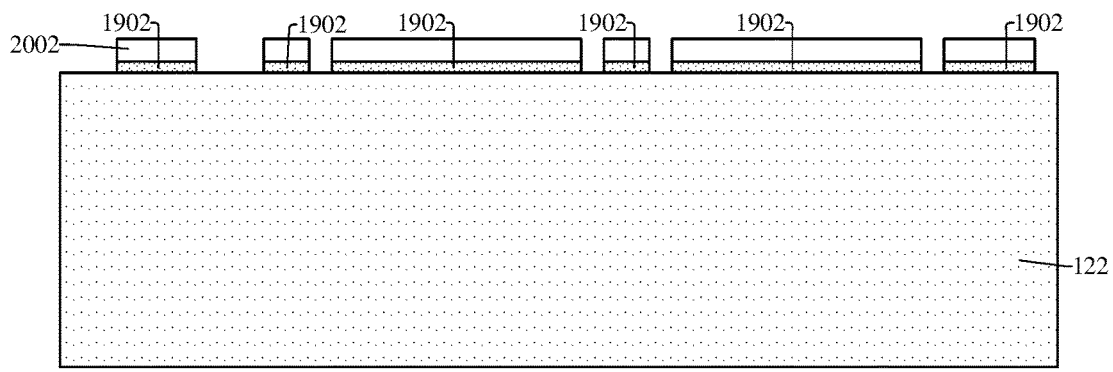

As shown in cross-sectional view 2000 of FIG. 20, the dielectric layer 1902 is patterned. In some embodiments, the patterning comprises forming a masking layer 2002 over the dielectric layer 1902 and etching the dielectric layer 1902 according to the masking layer 2002. In some embodiments, the etching comprises a dry etching process or some other suitable process.

Figure 21:
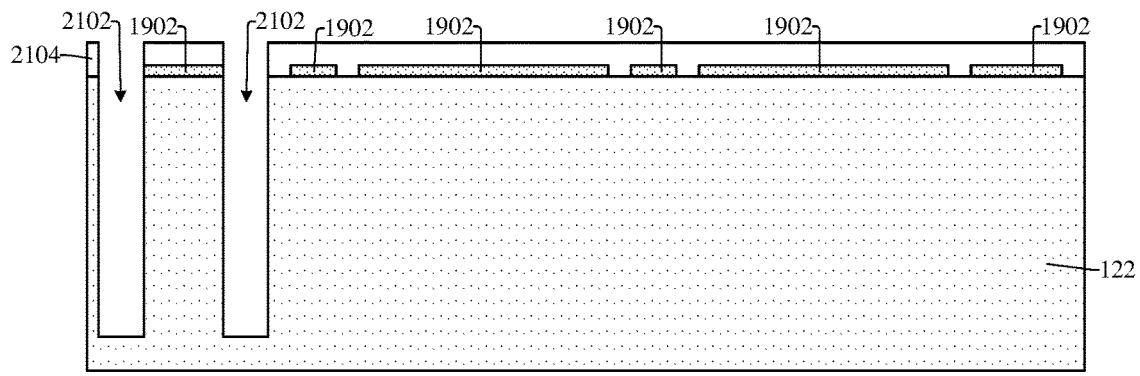

As shown in cross-sectional view 2100 of FIG. 21, the capping layer 122 is patterned to form a pair of pillar openings 2102 in the capping layer 122. In some embodiments, the patterning comprises forming a masking layer 2104 over the capping layer 122 and over the dielectric layer 1902, and etching the capping layer 122 according to the masking layer 2104. In some embodiments, the etching comprises a dry etching process or some other suitable process.

Figure 22:
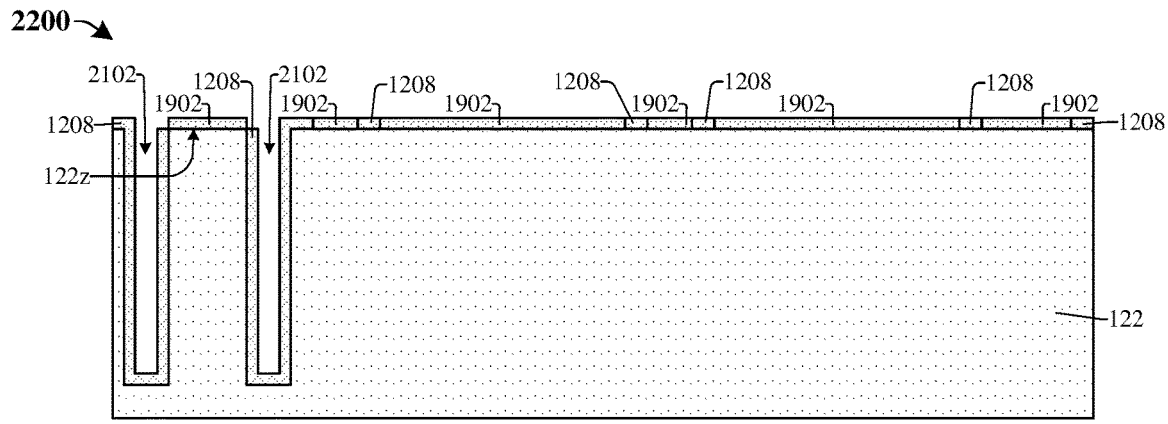

As shown in cross-sectional view 2200 of FIG. 22, a first isolation layer 1208 is deposited on the bottom surface 122z of the capping layer 122 and in the pillar openings 2102 (e.g., on sidewalls and a lower surface of the capping layer 122 that delimit the pillar openings 2102). In some embodiments, the first isolation layer 1208 is not deposited on the dielectric layer 1902. For example, the dielectric layer 1902 may block the first isolation layer 1208 from being deposited thereon. In some embodiments, the first isolation layer 1208 comprises silicon dioxide or some other suitable material and may be deposited by a CVD process, a PVD process, an ALD process, or some other suitable process.

Figure 23:
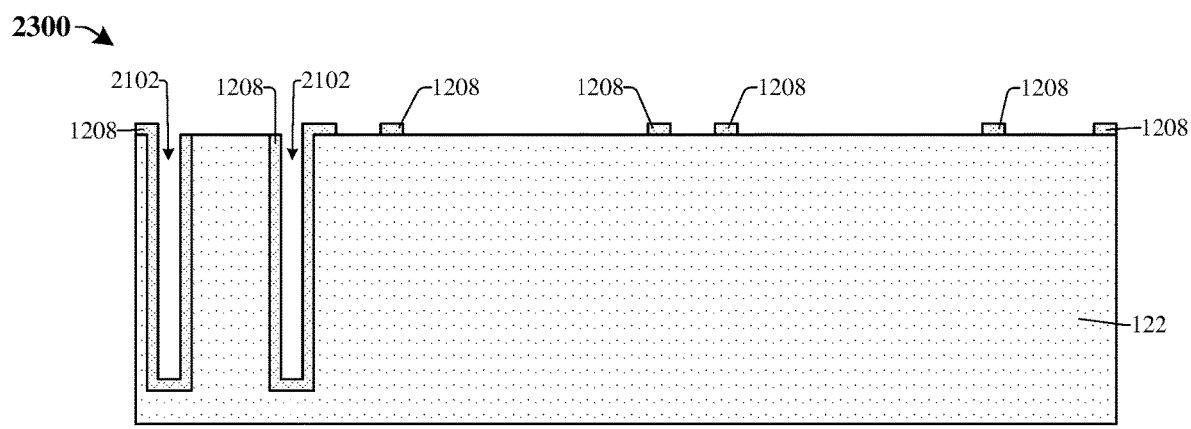

As shown in cross-sectional view 2300 of FIG. 23, the dielectric layer (e.g., 1902 of FIG. 22) is removed. In some embodiments, the dielectric layer 1902 is removed by an etching process that is selective to the dielectric layer 1902 (e.g., the etching removes the dielectric layer 1902 at a substantially faster rate than the first isolation layer 1208 and the capping layer 122).

Figure 24:
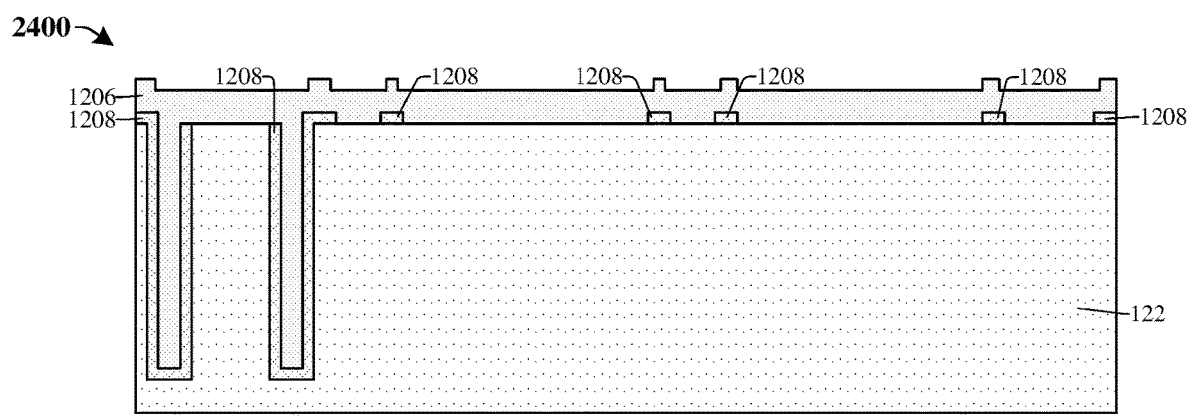

As shown in cross-sectional view 2400 of FIG. 24, a conductive layer 1206 is deposited over the capping layer 122, over the first isolation layer 1208, and in the pillar openings (e.g., 2102 of FIG. 23). The conductive layer 1206 fills a remainder of the pillar openings. In some embodiments, the conductive layer 1206 comprises polysilicon or some other suitable material and may be deposited by a CVD process, a PVD process, an ALD process, or some other suitable process.

Figure 25:
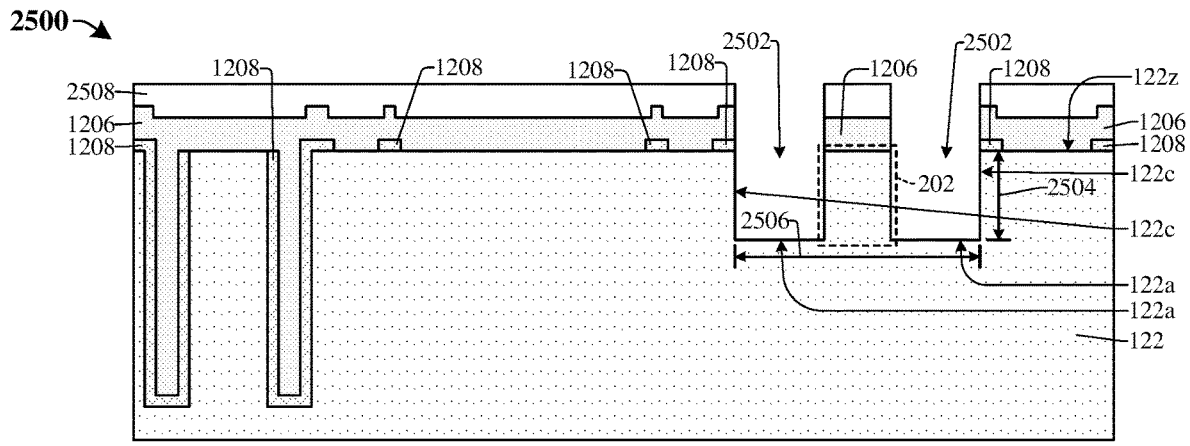

As shown in cross-sectional view 2500 of FIG. 25, the conductive layer 1206 and the capping layer 122 are patterned. In some embodiments (e.g., as illustrated in FIG. 25), the patterning forms a pair of first cap recesses 2502 in the capping layer 122 with a first protrusion 202 disposed therebetween. In some other embodiments (see, for example, FIG. 12), the patterning forms a single first cap recess in the capping layer 122. In some embodiments, the patterning comprises forming a masking layer 2508 over the conductive layer 1206 and etching the conductive layer 1206 and the capping layer 122 according to the masking layer 2508. In some embodiments, the etching comprises a dry etching process or some other suitable process.

In some embodiments, a depth 2504 (e.g., along a vertical direction) of the first cap recesses 2502 (e.g., a distance between the bottom surface 122z of the capping layer 122 and the first lower surface 122a of the capping layer 122) is about 1 micrometer to 10 micrometers, about 2 micrometers to 8 micrometers, or some other suitable depth. In some embodiments, a width 2506 (e.g., along a lateral direction) of the first cap recesses 2502 together (e.g., a distance between the first pair of sidewalls 122c of the capping layer 122) is about 200 micrometers to 800 micrometers, 250 micrometers to 750 micrometers, or some other suitable value. In some embodiments, a length (e.g., along a direction that extends into the page) of the first cap recesses 2502 is about 400 micrometers to 1100 micrometers, 500 micrometers to 1000 micrometers, or some other suitable value. In some embodiments, a depth (i.e., height) of the first protrusion 202 is approximately equal to the depth 2504 of the first cap recesses 2502, less than the depth 2504 of the first cap recesses 2502, or some other suitable depth.

Figure 26:
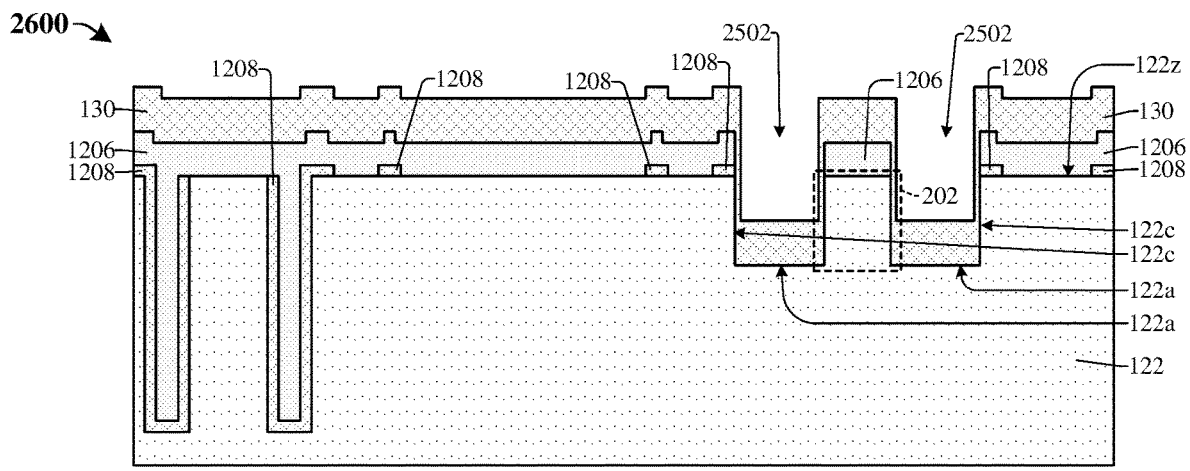

As shown in cross-sectional view 2600 of FIG. 26, a first outgas layer 130 is conformally deposited over the conductive layer 1206 and in the first cap recesses 2502 (e.g., on the first lower surface 122a of the capping layer 122 and between the first pair of sidewalls 122c of the capping layer 122). The first outgas layer 130 fills a portion of the first cap recesses 2502. In some embodiments, upper surfaces of the first outgas layer 130 in the first cap recesses 2502 are below the bottom surface 122z of the capping layer 122. In some embodiments, the first outgas layer 130 comprises silicon dioxide, aluminum oxide, or some other suitable material and may be deposited by a CVD process, a PVD process, an ALD process, or some other suitable process. In some embodiments, a thickness of the first outgas layer 130 may be controlled to control a pressure in the first cavity (e.g., 126 of FIG. 31).

Figure 27:
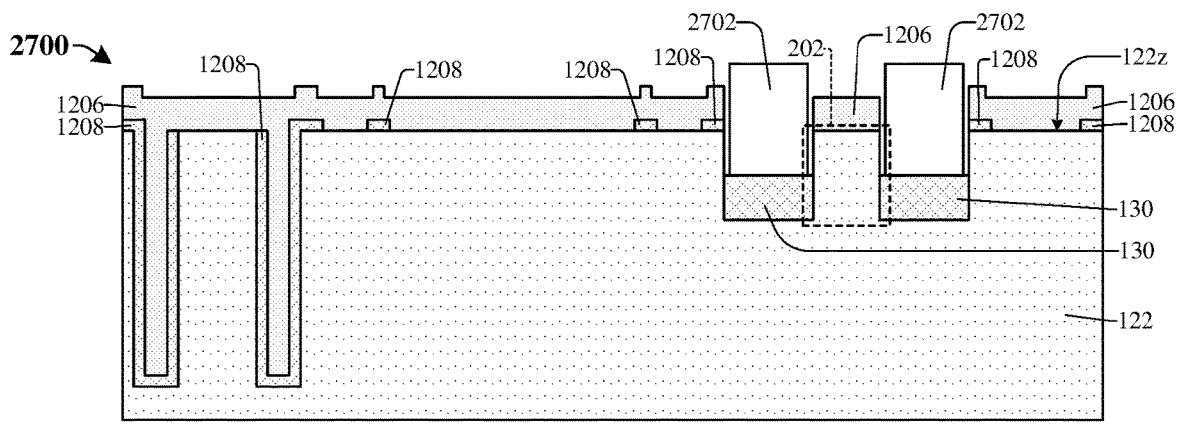

As shown in cross-sectional view 2700 of FIG. 27, the first outgas layer 130 is patterned. In some embodiments, the patterning removes the first outgas layer 130 from over the bottom surface 122z of the capping layer 122 and from over the conductive layer 1206 such that a remainder of the first outgas layer 130 after the patterning is disposed in the first cap recesses (e.g., 2502 of FIG. 26). In some embodiments, the patterning comprises forming a masking layer 2702 over the first outgas layer 130 in the first cap recesses (e.g., 2502 of FIG. 26) and etching the first outgas layer 130 according to the masking layer 2702. In some embodiments, the masking layer 2702 has masking layer segments that are disposed directly over the first cap recesses 2502 (e.g., directly over the first lower surface 122a) of the capping layer 122. In some embodiments, the etching comprises a dry etching process or some other suitable process.

Figure 28:
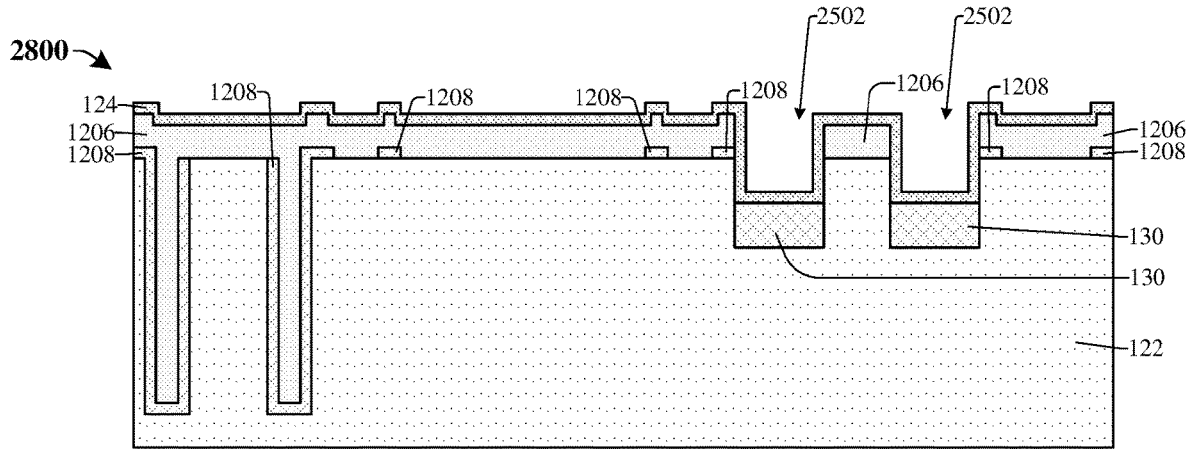

As shown in cross-sectional view 2800 of FIG. 28, a bonding layer 124 is deposited over the conductive layer 1206 and on the first outgas layer 130 in the first cap recesses 2502 (e.g., on sidewalls of the conductive layer 1206, on sidewalls of the capping layer 122, and on lower surfaces of the first outgas layer 130). In some embodiments, the bonding layer 124 comprises germanium or some other suitable material and may be deposited by a CVD process, a PVD process, an ALD process, or some other suitable process.

Figure 29:
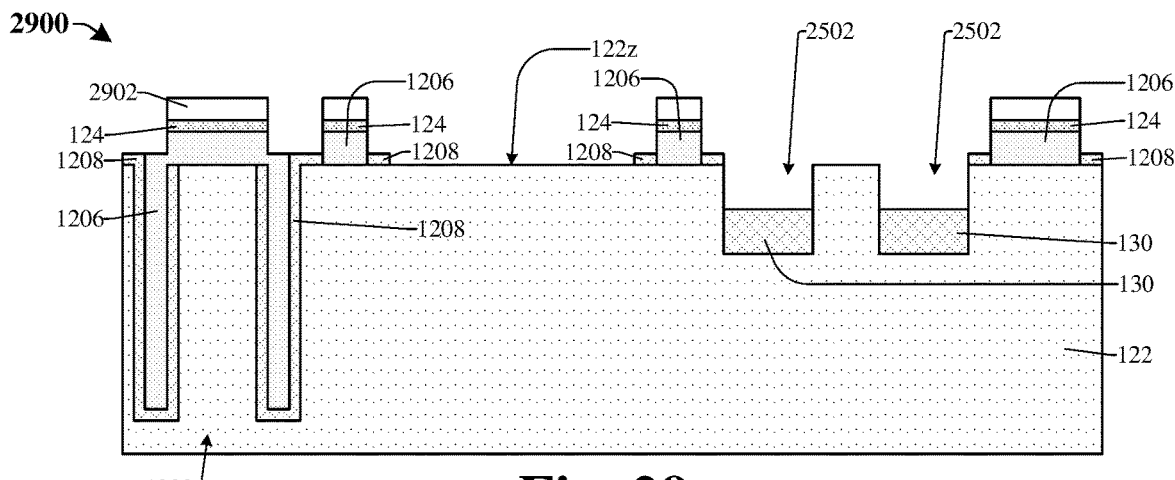

As shown in cross-sectional view 2900 of FIG. 29, the bonding layer 124 and the conductive layer 1206 are patterned. In some embodiments, the patterning removes the bonding layer 124 and the conductive layer 1206 from the first outgas layer 130, the first protrusion 202, and portions of the bottom surface 122z of the capping layer 122. The patterning forms bond ring structures 1212 from the bonding layer 124 and the conductive layer 1206. In addition, the patterning further forms a pillar structure 1202 from the conductive layer 1206.

In some embodiments, the patterning comprises forming a masking layer 2902 over the bonding layer 124 and etching the bonding layer 124 and the conductive layer 1206 according to the masking layer 2902. In some embodiments, the etching comprises a dry etching process or some other suitable process. In some embodiments, the etching is selective to the bonding layer 124 and the conductive layer 1206 (e.g., the etching removes the bonding layer 124 and the conductive layer 1206 at a substantially faster rate than the first isolation layer 1208, the first outgas layer 130, and the capping layer 122). In some embodiments, the etching can reduce a thickness of the first outgas layer 130 and/or the first isolation layer 1208.

Figure 30:
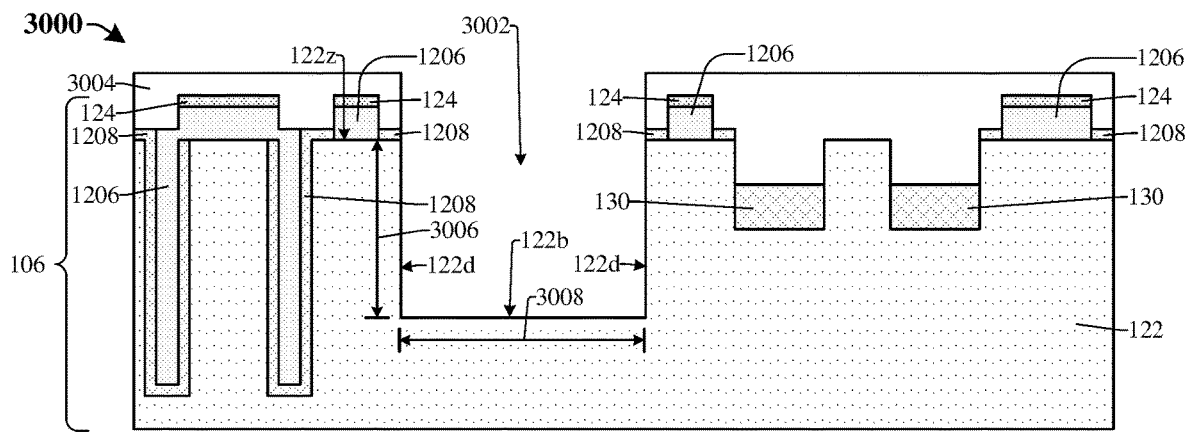

As shown in cross-sectional view 3000 of FIG. 30, the capping layer 122 is patterned to form a second cap recess 3002 in the capping layer 122. In some embodiments, the patterning comprises forming a masking layer 3004 over the capping layer 122 and etching the capping layer 122 according to the masking layer 3004. In some embodiments, the etching comprises a dry etching process or some other suitable process.

In some embodiments, a depth 3006 (e.g., along a vertical direction) of the second cap recess 3002 (e.g., a distance between the bottom surface 122z of the capping layer 122 and the second lower surface 122b of the capping layer 122) is about 10 micrometers to 100 micrometers, micrometers to 80 micrometers, or some other suitable depth. In some embodiments, a width 3008 (e.g., along a lateral direction) of the second cap recess 3002 (e.g., a distance between the second pair of sidewalls 122d of the capping layer 122) is about 1200 micrometers to 2000 micrometers, 1400 micrometers to 1800 micrometers, or some other suitable width. In some embodiments, a length (e.g., along a direction that extends into the page) of the second cap recess 3002 is about 1500 to 2100 micrometers, 1600 micrometers to 2000 micrometers, or some other suitable length.

In some embodiments (see, for example, FIG. 13), a second outgas layer (e.g., 1302 of FIG. 13) may be deposited on the second lower surface 122b of the capping layer 122 after the second cap recess 3002 is formed. In some embodiments, the second outgas layer may comprise silicon dioxide, aluminum oxide, an organic material (e.g., a carbon material comprising hydrogen, oxygen, a combination of the foregoing, or some other suitable material), or some other suitable material and may be deposited on the second lower surface 122b of the capping layer 122 by a CVD process, a PVD process, an ALD process, or some other suitable process. In some embodiments, the second outgas layer is deposited to have a different thickness (e.g., a lesser thickness) than the first outgas layer 130.

Figure 31:
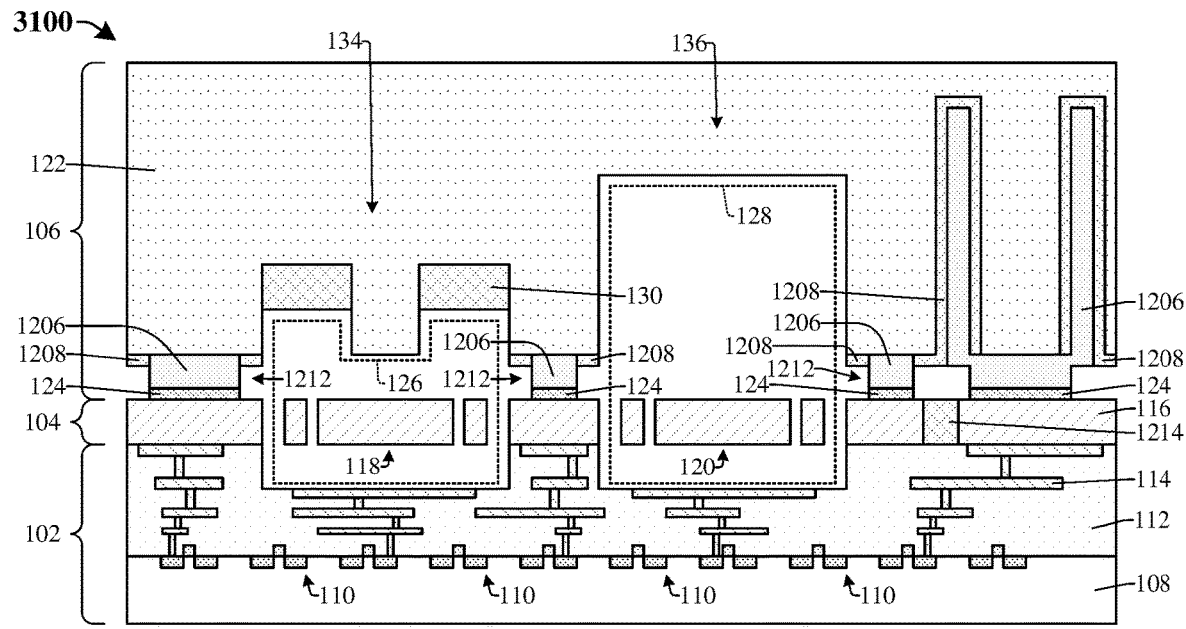

As shown in cross-sectional view 3100 of FIG. 31, the capping structure 106 is bonded to the MEMS structure 104 along the bonding layer 124. The bonding forms a first cavity 126 in which the first moveable mass 118 is arranged and a second cavity 128 in which the second moveable mass 120 is arranged. For example, the first device recess (e.g., 1802 of FIG. 18) and the first cap recesses (e.g., 2502 of FIG. 29) together form the first cavity 126 after the bonding. Further, the second device recess (e.g., 1804 of FIG. 18) and the second cap recess (e.g., 3002 of FIG. 30) together form the second cavity 128 after the bonding. The bonding seals (e.g., hermetically seals) the first cavity 126 and the second cavity 128. In some embodiments, the bonding comprises a eutectic bonding process, a thermal bonding process, a compression bonding process, some other suitable bonding process, or any combination of the foregoing. In some embodiments, a metal layer (not shown) comprising aluminum, copper, a combination of the foregoing, or some other suitable material is be formed on the MEMS layer 116 prior to the bonding. In such embodiments, the bonding layer 124 is bonded to the metal layer. After the bonding process, the first cavity 126 and the second cavity 128 have the common base pressure (e.g., less than 3 millibar, less than 10 millibar, or some other value).

A baking process is performed after the bonding process. The baking process comprises heating the first outgas layer 130. In response to the baking, an outgas species (e.g., argon gas, hydrogen gas, oxygen gas, carbon dioxide gas, or some other gas) is released from the first outgas layer 130 into the first cavity 126. As a result, the pressure in the first cavity 126 can be increased (e.g., to a value within first optimal range for the first MEMS device 134) while the pressure in the second cavity 128 can be maintained at the base pressure.

In some embodiments, the baking process may comprise heating the integrated chip (e.g., in an oven or the like) at a temperature of about 200 to 500 degrees Celsius, 300 to 400 degrees Celsius, or some other suitable temperature.

In some embodiments, the heating process is performed at least until the pressure in the first cavity 126 is substantially greater than the pressure in the second cavity 128 (e.g., at least until the pressure in the first cavity 126 is greater than the pressure in the second cavity 128 by 75 millibar or more). In some embodiments, the heating process is performed at least until the pressure in the first cavity 126 reaches the first optimal pressure range for the first MEMS device 134. The duration of the baking process can be controlled to control the pressure in the first cavity 126 and the second cavity 128. For example, a longer duration baking process can cause the first outgas layer 130 to release more outgas species into the first cavity 126, thereby increasing the pressure in the first cavity 126.

Figure 32:
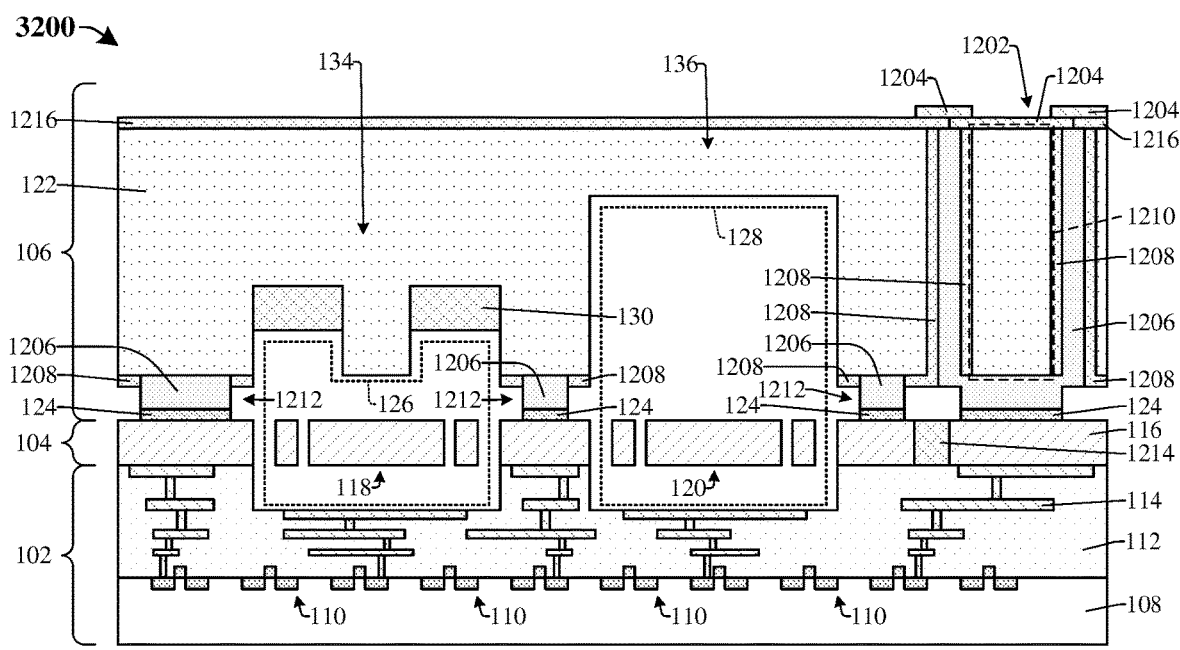

As shown in cross-sectional view 3200 of FIG. 32, the top surface of the capping layer 122 is recessed (e.g., thinned) to a top of the conductive layer 1206. A second isolation layer 1216 is formed on the recessed top surface of capping layer 122 and on the exposed top of the conductive layer 1206. The second isolation layer 1216 is patterned to form openings for conductive features 1204. The conductive features 1204 are formed in the openings on the top surface of the capping layer 122 directly over the cap pillar to further form the pillar structure 1202. In some embodiments, the recessing of the top surface of the capping layer 122 comprises a blanket etch-back process, a chemical mechanical planarization (CMP) process, or some other suitable process.

FIGS. 33-43 illustrate cross-sectional views 3300-4300 of some other embodiments of a method for forming an integrated chip comprising a first moveable mass 118 within a first cavity 126, a second moveable mass 120 within a second cavity 128, and a first outgas layer 130 arranged along the first cavity 126. Although FIGS. 33-43 are described in relation to a method, it will be appreciated that the structures disclosed in FIGS. 33-43 are not limited to such a method, but instead may stand alone as structures independent of the method.

Figure 33:
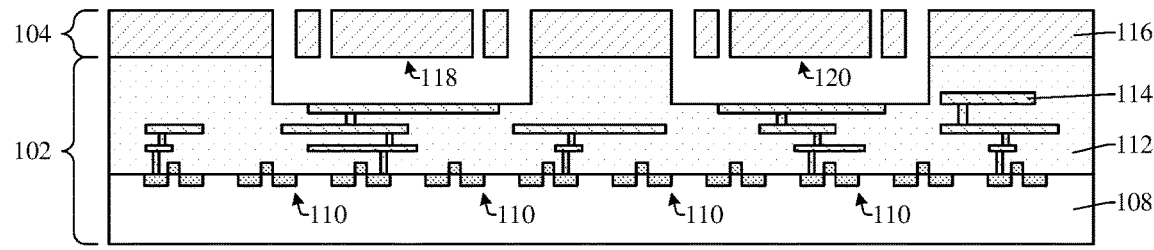
FIGS. 33-43 illustrate cross-sectional views of some other embodiments of a method for forming an integrated chip comprising a first moveable mass within a first cavity, a second moveable mass within a second cavity, and a first outgas layer arranged along the first cavity.

As shown in cross-sectional view 3300 of FIG. 33, a semiconductor device structure 102 and a MEMS structure 104 are formed (e.g., by a process similar to the process illustrated in FIGS. 14-18).

Figure 34:
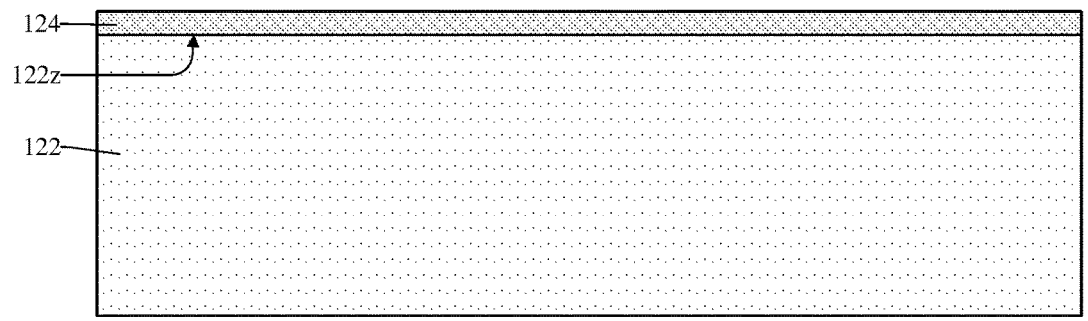

As shown in cross-sectional view 3400 of FIG. 34, a bonding layer 124 is deposited on a bottom surface 122z of a capping layer 122. In some embodiments, the bonding layer 124 comprises germanium or some other suitable material and may be deposited by a CVD process, a PVD process, an ALD process, or some other suitable process.

Figure 35:
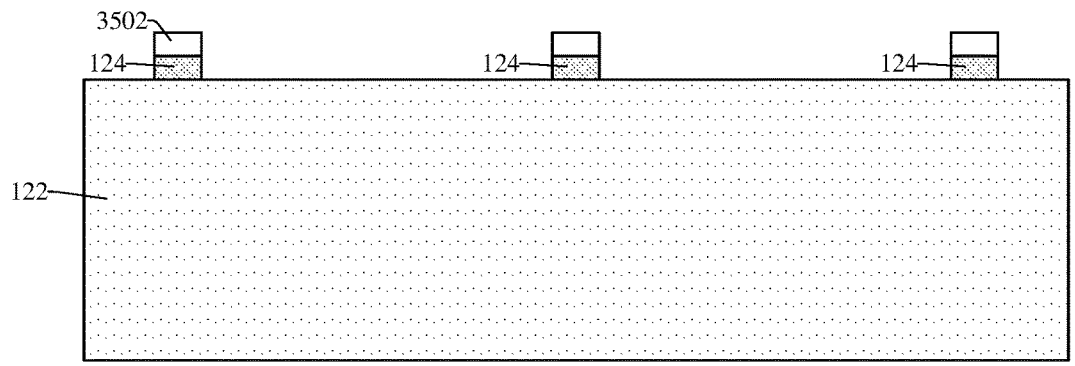

As shown in cross-sectional view 3500 of FIG. 35, the bonding layer 124 is patterned. In some embodiments, the patterning comprises forming a masking layer 3502 over the bonding layer 124 and etching the bonding layer 124 according to the masking layer 3502. In some embodiments, the etching comprises a dry etching process or some other suitable process.

Figure 36:
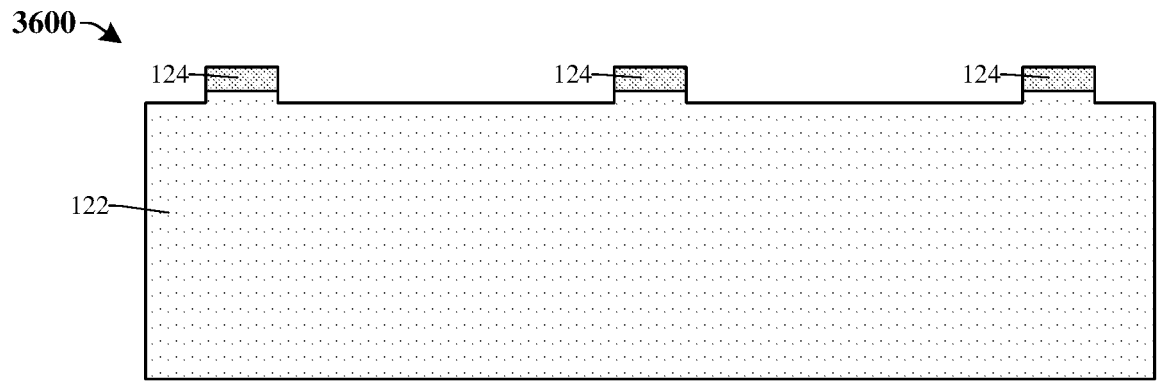

As shown in cross-sectional view 3600 of FIG. 36, the capping layer 122 is patterned. In some embodiments, the patterning comprises etching the capping layer 122 according to the bonding layer 124. In some embodiments, the etching comprises a dry etching process or some other suitable process. In some embodiments, a depth of the etching may be about 2 micrometers to 4 micrometers or some other suitable depth.

Figure 37:
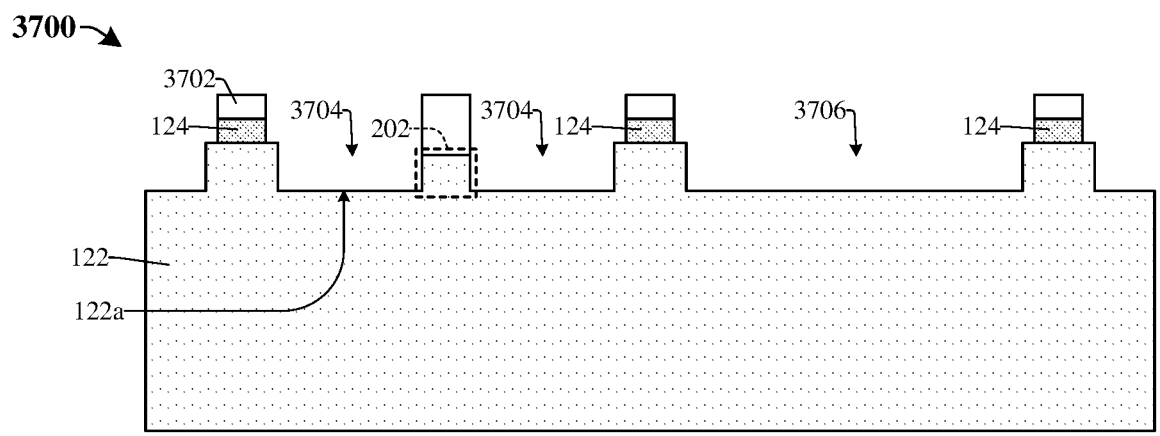

As shown in cross-sectional view 3700 of FIG. 37, the capping layer 122 is patterned to form a first protrusion 202 and a pair of first cap recesses 3704 on opposite sides of the first protrusion 202. The patterning further forms a second cap recess 3706 laterally spaced apart from the first cap recess 3704. In some embodiments, the patterning comprises forming a masking layer 3702 over the bonding layer 124 and over the capping layer 122 and etching the capping layer 122 according to the masking layer 3702. In some embodiments, the etching comprises a dry etching process or some other suitable process. In some embodiments, portions of the bonding layer 124 are also etched. In some embodiments, a depth of the etching may be about 2 micrometers to 4 micrometers or some other suitable depth.

Figure 38:
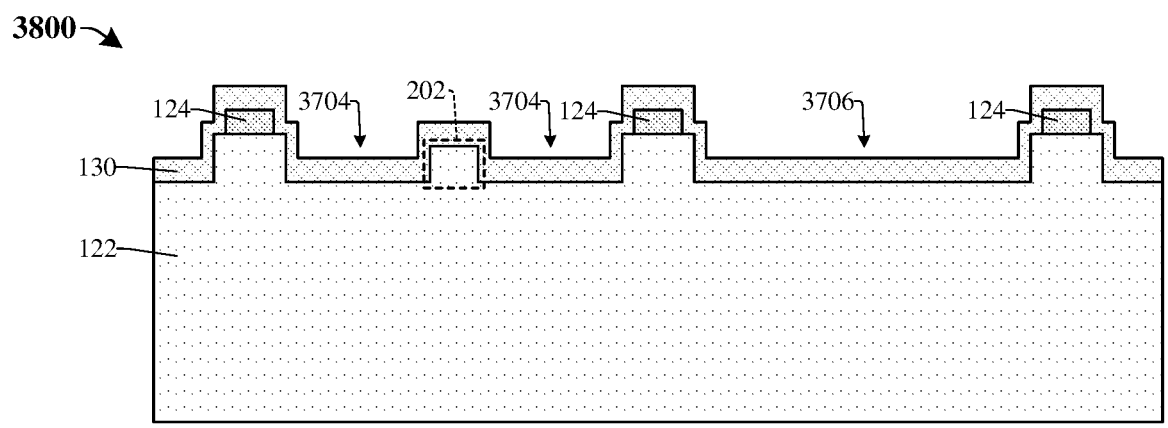

As shown in cross-sectional view 3800 of FIG. 38, a first outgas layer 130 is deposited over the capping layer 122 and over the bonding layer 124. For example, the first outgas layer is deposited in the pair of first cap recesses 3704, on the first protrusion 202, and in the second cap recess 3706. In some embodiments, the first outgas layer 130 comprises silicon dioxide, aluminum oxide, or some other suitable material and may be deposited by a CVD process, a PVD process, an ALD process, or some other suitable process.

Figure 39:
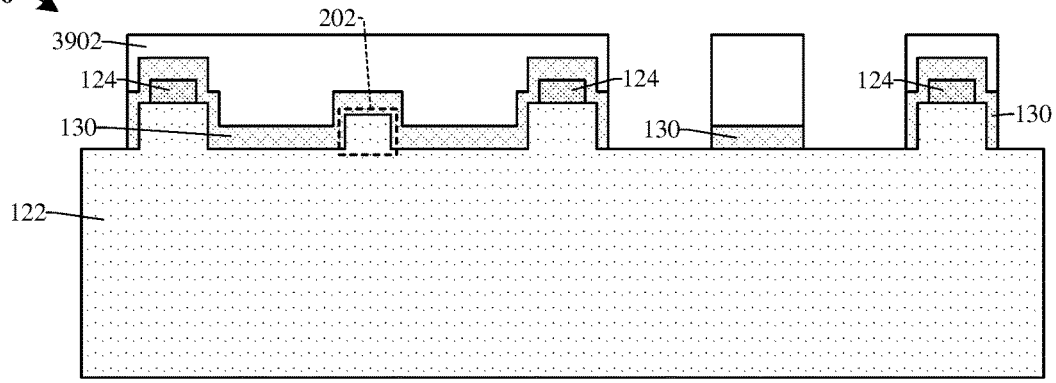

As shown in cross-sectional view 3900 of FIG. 39, the first outgas layer 130 is patterned. The patterning removes the first outgas layer 130 from portions of the capping layer 122. For example, the patterning removes the first outgas layer 130 from portions of the capping layer 122 at the second cap recess (e.g., 3706 of FIG. 37). In some embodiments, a segment of the first outgas layer 130 remains on the capping layer 122 at the second cap recess (e.g., 3706 of FIG. 37) after the patterning. In some embodiments, the patterning comprises forming a masking layer 3902 over the first outgas layer 130 and etching the first outgas layer 130 according to the masking layer 3902. In some embodiments, the etching comprises a dry etching process or some other suitable process.

Figure 40:
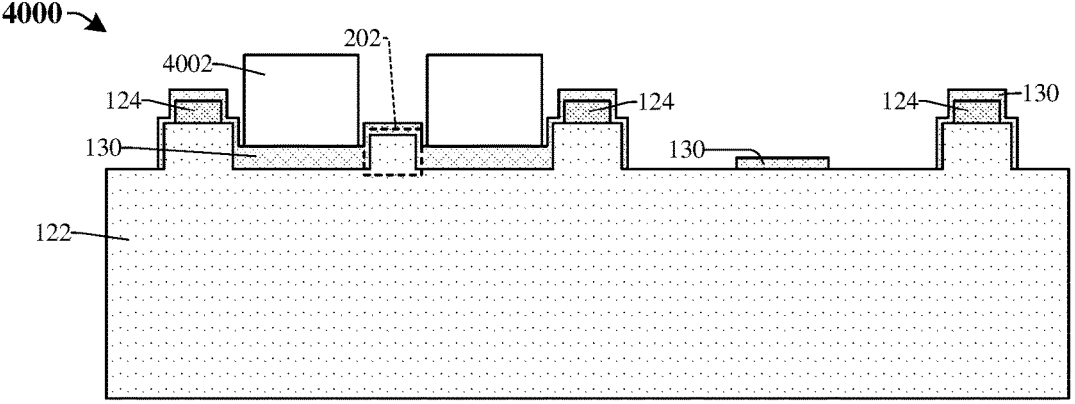

As shown in cross-sectional view 4000 of FIG. 40, portions of the first outgas layer 130 are thinned (e.g., reduced in thickness). For example, the segment of the first outgas layer 130 at the second cap recess (e.g., 3706 of FIG. 37) is thinned. Portions of the first outgas layer 130 at the first cap recesses (e.g., 3704 of FIG. 37) are protected from the thinning by a masking layer 4002. In some embodiments, the thinning comprises forming the masking layer 4002 over the first outgas layer 130 at the first cap recesses and etching the first outgas layer 130 with the masking layer 4002 in place. In some embodiments, the portions of the first outgas layer 130 that are thinned may have their thickness reduced by about 40 percent to 60 percent or some other suitable value.

Figure 41:
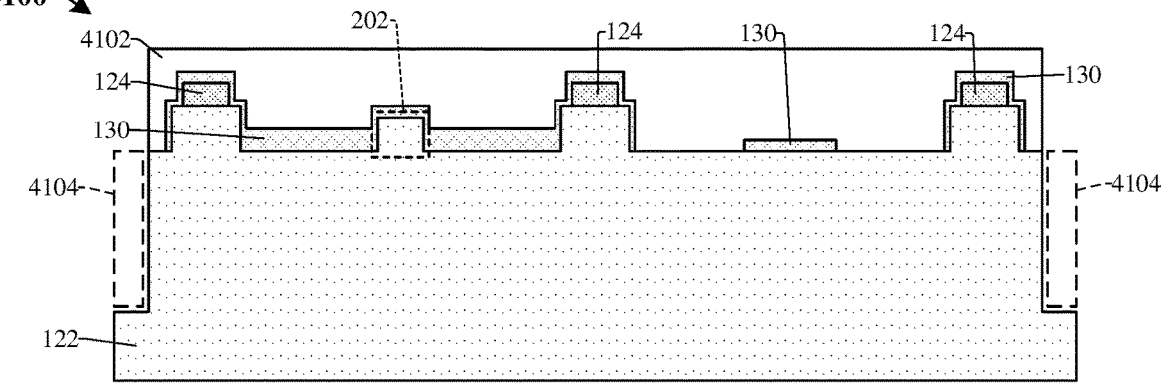

As shown in cross-sectional view 4100 of FIG. 41, the capping layer 122 is patterned to form scribe line trenches 4104. In some embodiments, the patterning comprises forming a masking layer 4102 over the capping layer 122 and etching the capping layer 122 according to the masking layer 4102. In some embodiments, the etching comprises a dry etching process or some other suitable process.

Figure 42:
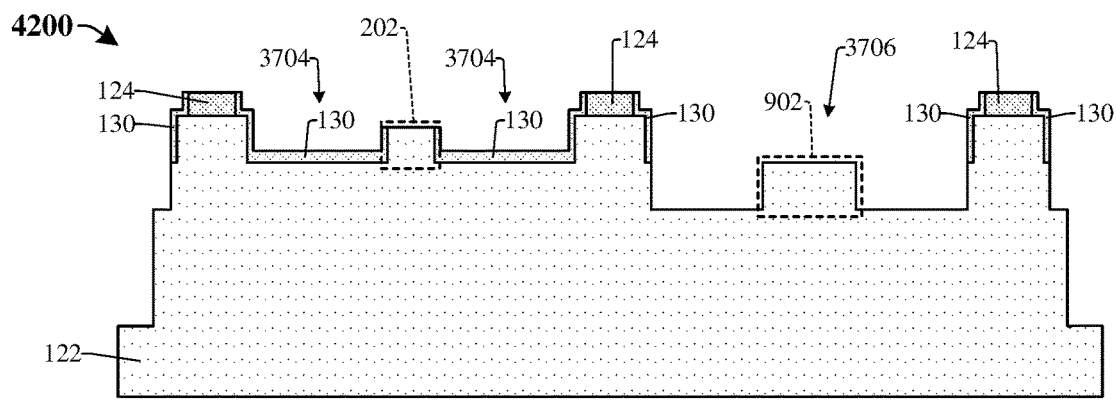

As shown in cross-sectional view 4200 of FIG. 42, the capping layer 122 is etched with the bonding layer 124 and the first outgas layer 130 in place. In some embodiments, the etching is selective to the capping layer 122 (e.g., removes the capping layer 122 at a substantially faster rate than the bonding layer 124 and the first outgas layer 130). The etching forms a second protrusion 902 and extends the second cap recess 3706 deeper into the capping layer 122 on opposite sides of the second protrusion 902. The etching removes the segment of the first outgas layer 130 from the second cap recess 3706. In addition, the etching reduces a thickness of the first outgas layer 130 at the first cap recesses (e.g., 3704 of FIG. 37).

Figure 43:
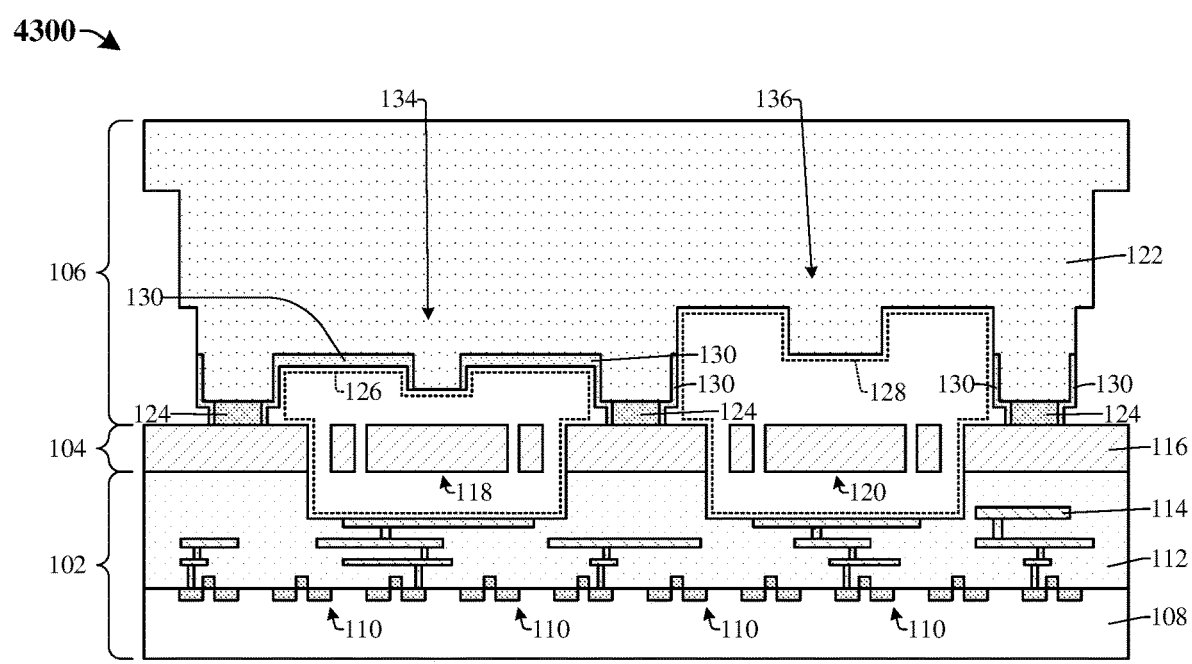

As shown in cross-sectional view 4300 of FIG. 43, a bonding process (e.g., similar to the bonding process illustrated in FIG. 31) is performed to bond the capping structure 106 to the MEMS structure 104. Further, a baking process (e.g., similar to the baking process discussed with regard to FIG. 31) is performed to trigger the release of an outgas species from the first outgas layer 130 into the first cavity 126 to increase the pressure in the first cavity 126.

FIGS. 44-50 illustrate cross-sectional views 4400-5000 of some embodiments of a method for forming a capping structure. Although FIGS. 4400-5000 are described in relation to a method, it will be appreciated that the structures disclosed in FIGS. 4400-5000 are not limited to such a method, but instead may stand alone as structures independent of the method.

Figure 44:
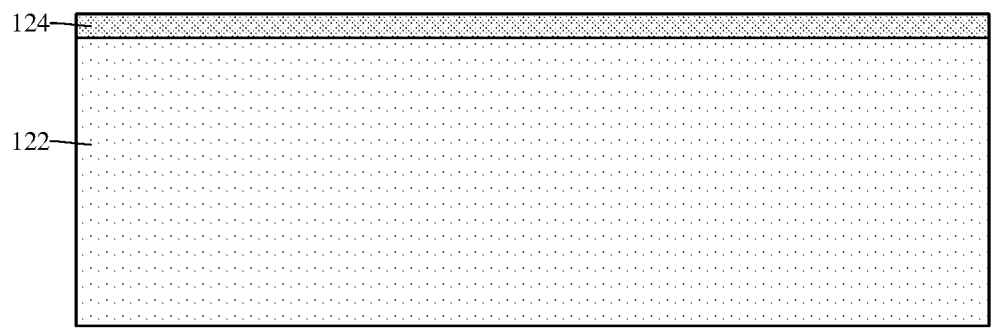
FIGS. 44-50 illustrate cross-sectional views of some embodiments of a method for forming a capping structure.

As shown in cross-sectional view 4400 of FIG. 44, a bonding layer 124 is deposited on a capping layer 122. In some embodiments, the bonding layer 124 comprises germanium or some other suitable material and may be deposited by a CVD process, a PVD process, an ALD process, or some other suitable process.

Figure 45:
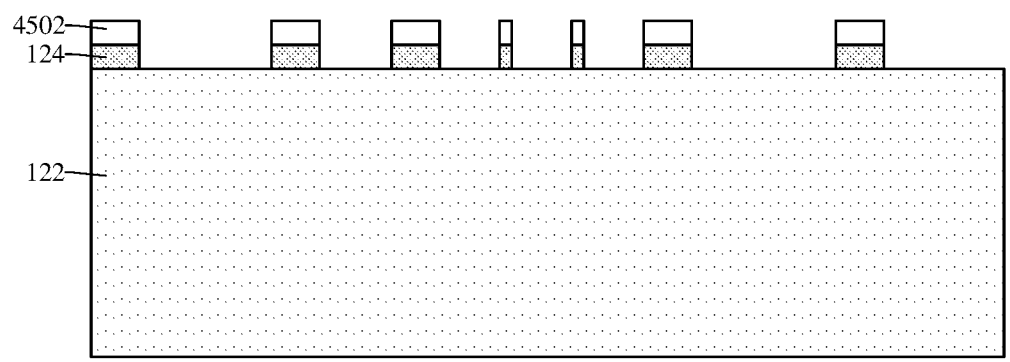

As shown in cross-sectional view 4500 of FIG. 45, the bonding layer 124 is patterned. In some embodiments, the patterning comprises forming a masking layer 4502 over the bonding layer 124 and etching the bonding layer 124 according to the masking layer 4502. In some embodiments, the etching comprises a dry etching process or some other suitable process.

Figure 46:
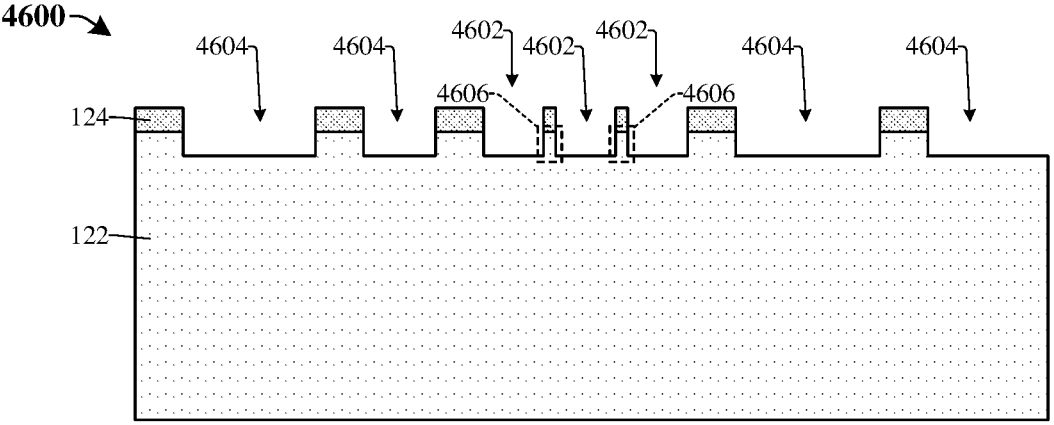

As shown in cross-sectional view 4600 of FIG. 46, the capping layer 122 is patterned to form a plurality of first recesses 4602 and a plurality of peripheral recesses 4604. A plurality of first protrusions 4606 are formed between the first recesses 4602. In some embodiments, the patterning comprises etching the capping layer 122 according to the bonding layer 124. In some embodiments, the etching comprises a dry etching process or some other suitable process.

Figure 47:
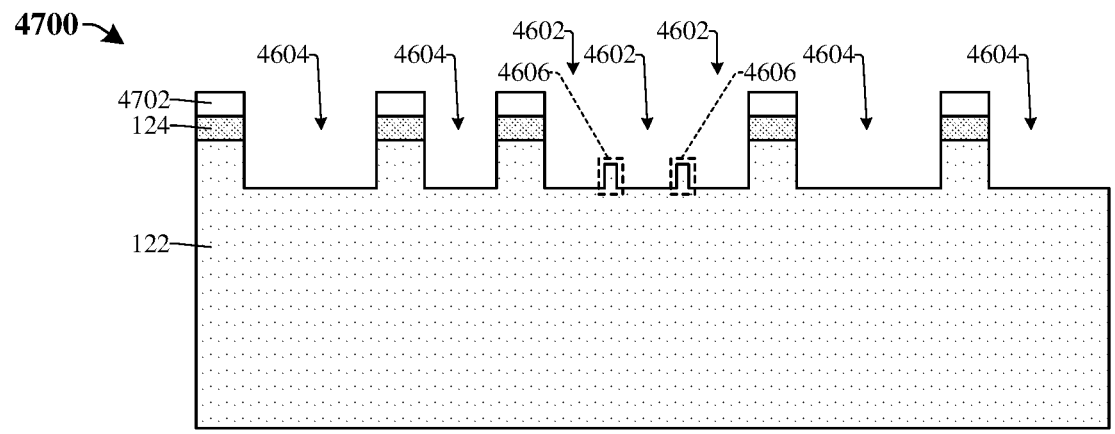

As shown in cross-sectional view 4700 of FIG. 47, the capping layer is patterned to increase a depth of the first recesses 4602, to increase depths of the peripheral recesses 4604, and to remove the bonding layer 124 from tops of the first protrusions 4606. In some embodiments, the patterning comprises forming a masking layer 4702 over portions of the bonding layer 124 and etching portions of the bonding layer 124 and the capping layer 122 according to the masking layer 4702. In some embodiments, the etching comprises a dry etching process or some other suitable process.

Figure 48:
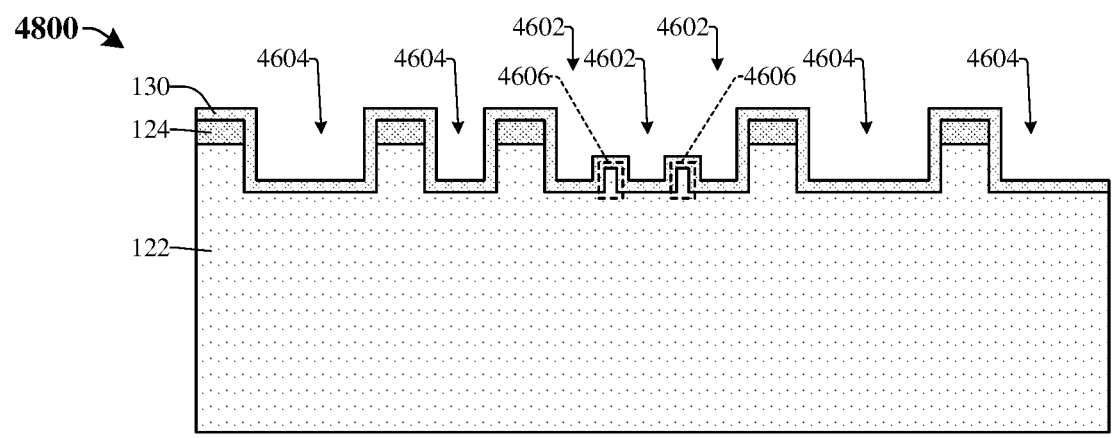

As shown in cross-sectional view 4800 of FIG. 48, a first outgas layer 130 is conformally deposited over the capping layer 122 and over the bonding layer 124. In some embodiments, the first outgas layer 130 comprises silicon dioxide, aluminum oxide, or some other suitable material and is deposited by a CVD process, a PVD process, an ALD process, or some other suitable process.

Figure 49:
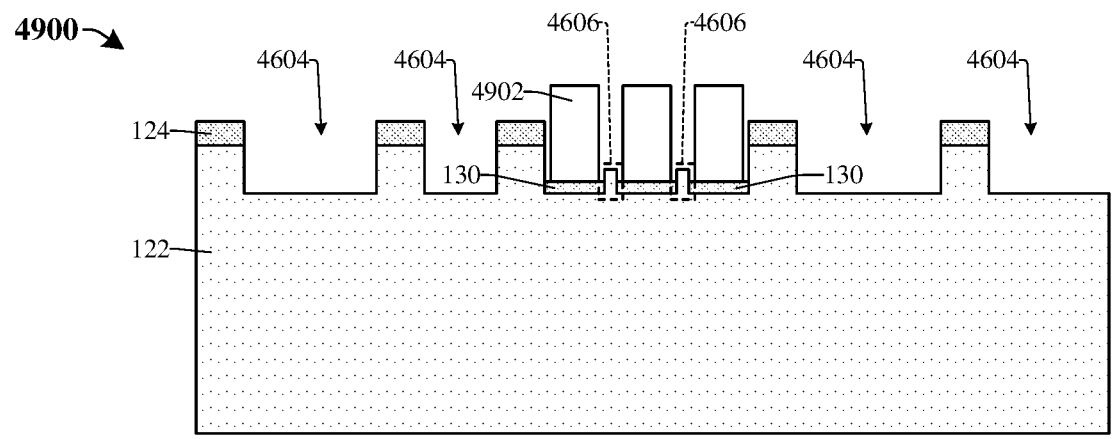

As shown in cross-sectional view 4900 of FIG. 49, the first outgas layer 130 is patterned to remove the first outgas layer 130 from tops of the bonding layer 124 and from the capping layer 122 at the peripheral recesses 4604. In some embodiments, the patterning comprises forming a masking layer 4902 over the first outgas layer 130 at the first recess 4602 and etching the first outgas layer 130 according to the masking layer 4902. In some embodiments, the etching comprises a dry etching process or some other suitable process. In some embodiments, the patterning removes the first outgas layer 130 from tops of the first protrusions 4606.

Figure 50:
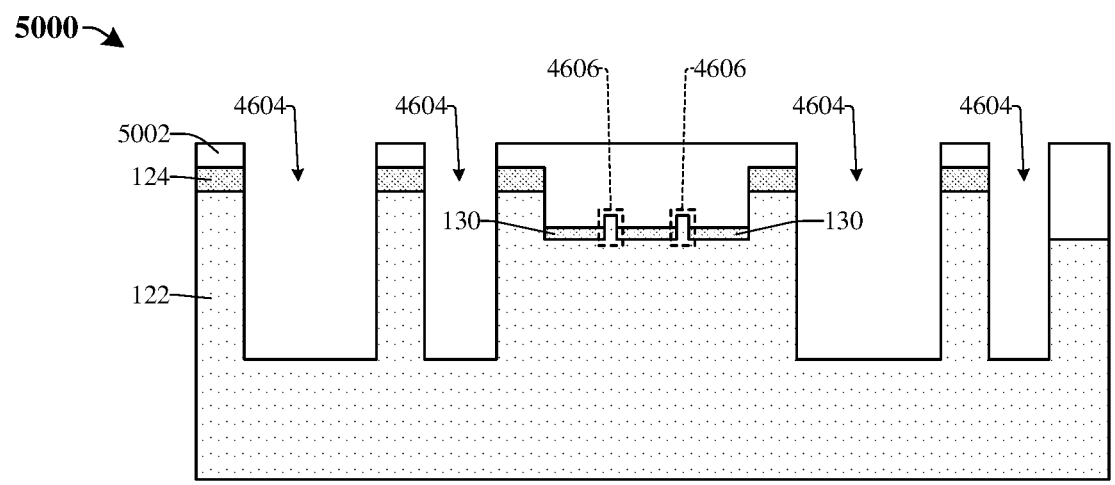

As shown in cross-sectional view 5000 of FIG. 50, the capping layer is patterned to increase the depths of the peripheral recesses 4604. In some embodiments, the patterning comprises forming a masking layer 5002 over the capping layer 122 and etching the capping layer 122 according to the masking layer 5002. In some embodiments, the etching comprises a dry etching process or some other suitable process. In some embodiments, the peripheral recesses 4604 are disposed along scribe lines or the like (e.g., the capping layer 122 may be diced along one or more of the peripheral recesses 4604).

In some embodiments, the capping layer 122 is subsequently bonded (not shown) to a MEMS structure and the first outgas layer 130 is subsequently heated (e.g., with a baking process) to cause an outgas species to release into a first cavity from the first outgas layer 130 to increase the pressure in the first cavity.

Figure 51:
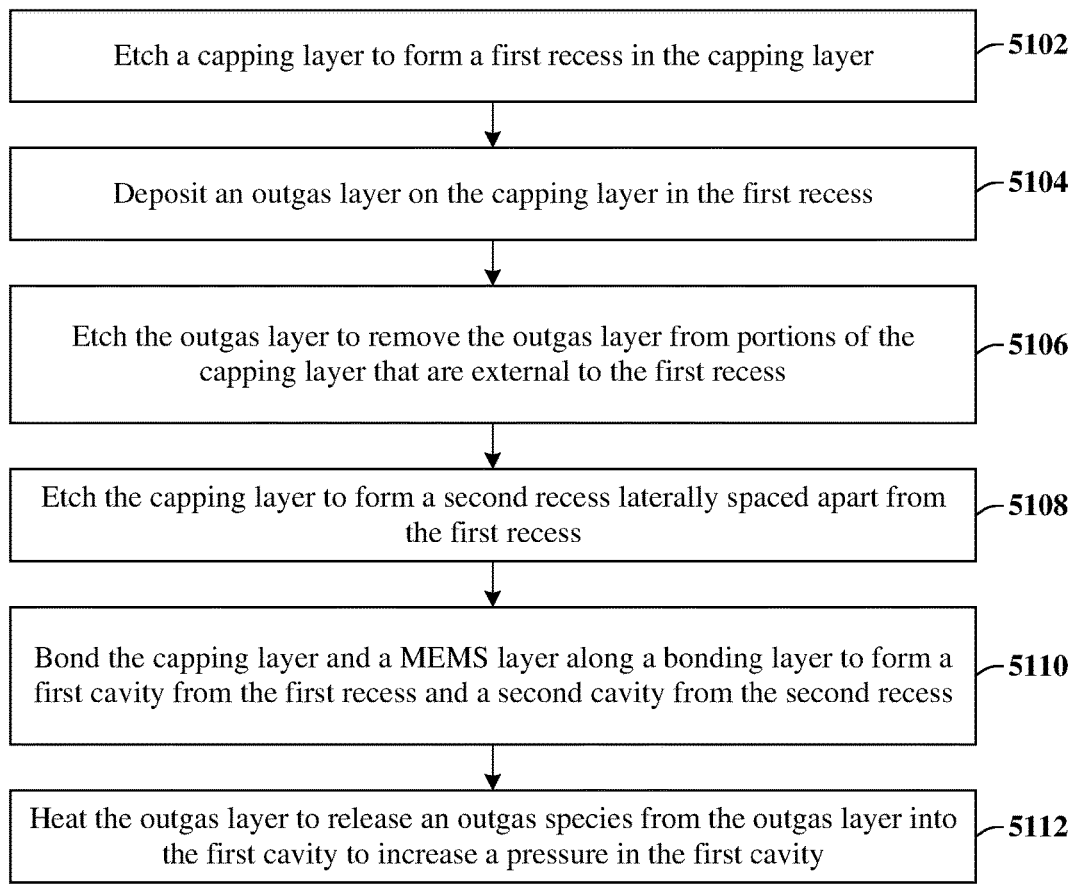
FIG. 51 illustrates a flow diagram of some embodiments of a method for forming an integrated chip comprising a first cavity, a second cavity, and an outgas layer arranged along the first cavity.

FIG. 51 illustrates a flow diagram of some embodiments of a method 5100 for forming an integrated chip comprising a first cavity, a second cavity, and an outgas layer arranged along the first cavity. While method 5100 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 5102, etch a capping layer to form a first recess in the capping layer. FIG. 25 illustrates a cross-sectional view 2500 of some embodiments corresponding to act 5102. FIG. 37 illustrates a cross-sectional view 3700 of some other embodiments corresponding to act 5102.

At 5104, deposit an outgas layer on the capping layer in the first recess. FIG. 26 illustrates a cross-sectional view 2600 of some embodiments corresponding to act 5104. FIG. 38 illustrates a cross-sectional view 3800 of some other embodiments corresponding to act 5104.

At 5106, etch the outgas layer to remove the outgas layer from portions of the capping layer that are external to the first recess. FIG. 27 illustrates a cross-sectional view 2700 of some embodiments corresponding to act 5106. FIGS. 39 and 40 illustrate cross-sectional views 3900 and 4000, respectively, of some other embodiments corresponding to act 5106.

At 5108, etch the capping layer to form a second recess laterally spaced apart from the first recess. FIG. 30 illustrates a cross-sectional view 3000 of some embodiments corresponding to act 5108. FIG. 42 illustrates a cross-sectional view 4200 of some other embodiments corresponding to act 5108.

At 5110, bond the capping layer and a MEMS layer along a bonding layer to form a first cavity from the first recess and a second cavity from the second recess. FIG. 31 illustrates a cross-sectional view 3100 of some embodiments corresponding to act 5110. FIG. 43 illustrates a cross-sectional view 4300 of some other embodiments corresponding to act 5110.

At 5112, heat the outgas layer to release an outgas species from the outgas layer into the first cavity to increase a pressure in the first cavity. FIG. 31 illustrates a cross-sectional view 3100 of some embodiments corresponding to act 5112. FIG. 43 illustrates a cross-sectional view 4300 of some other embodiments corresponding to act 5112.

Thus, the present disclosure relates to an integrated chip including a first cavity and a second cavity, and a method for forming the integrated chip such that a pressure in the first cavity is substantially different from a pressure in the second cavity.

Accordingly, in some embodiments, the present disclosure relates to an integrated chip. The integrated chip includes a semiconductor device substrate. A plurality of semiconductor devices are arranged along the semiconductor device substrate. A micro-electromechanical system (MEMS) layer including a semiconductor overlies the semiconductor device substrate. The MEMS layer includes a first moveable mass and a second moveable mass laterally spaced apart from the first moveable mass. A capping layer including a semiconductor overlies the MEMS layer. The capping layer has a first lower surface directly over the first moveable mass, a first pair of sidewalls on opposite sides of the first lower surface and extending below the first lower surface, a second lower surface directly over the second moveable mass, and a second pair of sidewalls on opposite sides of the second lower surface and extending below the second lower surface. An outgas layer is on the first lower surface and directly between the first pair of sidewalls. The first pair of sidewalls and a lower surface of the outgas layer delimit a first cavity in which the first moveable mass is arranged. The second pair of sidewalls and the second lower surface of the capping layer delimit a second cavity in which the second moveable mass is arranged.

In other embodiments, the present disclosure relates to a method for forming an integrated chip. The method includes etching a capping layer with a first etching process to form a first recess in the capping layer. The first recess is delimited by a first lower surface of the capping layer and a first pair of sidewalls of the capping layer. An outgas layer is deposited on the first lower surface of the capping layer. A masking layer is formed on the outgas layer and directly over the first lower surface of the capping layer. The outgas layer is etched with a second etching process and with the masking layer in place to remove the outgas layer from a portion of the capping layer. The outgas layer remains on the first lower surface of the capping layer after the second etching process. The capping layer is etched with a third etching process to form a second recess in the capping layer laterally spaced apart from the first recess by the capping layer. The second recess is delimited by a second lower surface of the capping layer and a second pair of sidewalls of the capping layer.

In yet other embodiments, the present disclosure relates to a method for forming an integrated chip. The method includes forming a first masking layer over a capping layer. The capping layer is etched with a first etching process and with the first masking layer in place to form a pair of first recesses in the capping layer and a first capping layer protrusion disposed between the pair of first recesses. The pair of first recesses are delimited by a pair of first lower surfaces of the capping layer. An outgas layer is deposited on the pair of first lower surfaces of the capping layer. A second masking layer is formed on the outgas layer. The second masking layer has a pair of second masking layer segments respectively disposed directly over the pair of first lower surfaces of the capping layer. The outgas layer is etched with a second etching process and with the second masking layer in place to remove the outgas layer from a portion the capping layer. The outgas layer remains on the pair of first lower surfaces of the capping layer after the second etching process. The capping layer is etched with a third etching process to form a second recess in the capping layer. The second recess laterally is spaced apart from the pair of first recesses by the capping layer. The capping layer is bonded to a micro-electromechanical system (MEMS) layer. The MEMS layer includes a first moveable mass and a second moveable mass laterally spaced apart from the first moveable mass. After the bonding, the pair of first recesses and the outgas layer delimit, in part, a first cavity in which the first moveable mass is arranged and the second recess delimits, in part, a second cavity in which the second moveable mass is arranged. The outgas layer is heated to release an outgas species into the first cavity from the outgas layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming an integrated chip, the method comprising:
    etching a capping layer with a first etching process to form a first recess in the capping layer, wherein the first recess is delimited by a first lower surface of the capping layer and a first pair of sidewalls of the capping layer;
    depositing a first outgas layer on the first lower surface of the capping layer, the first outgas layer having a first thickness;
    forming a masking layer on the first outgas layer and directly over the first lower surface of the capping layer;
    etching the first outgas layer with a second etching process and with the masking layer in place to remove the first outgas layer from a portion of the capping layer, wherein the outgas layer remains on the first lower surface of the capping layer after the second etching process;
    etching the capping layer with a third etching process to form a second recess in the capping layer laterally spaced apart from the first recess by the capping layer, wherein the second recess is delimited by a second lower surface of the capping layer and a second pair of sidewalls of the capping layer; and
    depositing a second outgas layer on the second lower surface of the capping layer, the second outgas layer having a second thickness different than the first thickness.

2. The method of claim 1, further comprising:
    bonding the capping layer to a micro-electromechanical system (MEMS) layer, the MEMS layer comprising a first moveable mass and a second moveable mass laterally spaced apart from the first moveable mass, wherein the capping layer is bonded to the MEMS layer such that the first recess and the first outgas layer are directly over the first moveable mass and such that the second recess is directly over the second moveable mass.

3. The method of claim 2, wherein the bonding forms a first cavity from the first recess and a second cavity from the second recess.

4. The method of claim 3, further comprising:
heating the first outgas layer to release an outgas species from the first outgas layer into the first cavity to increase a pressure in the first cavity, wherein the pressure in the first cavity is substantially greater than a pressure in the second cavity after the heating.

5. The method of claim 1, wherein the first etching process forms a first capping layer protrusion between the first pair of sidewalls of the capping layer, wherein the first outgas layer is deposited on sidewalls of the first capping layer protrusion.

6. The method of claim 5, wherein the third etching process forms a second protrusion between the second pair of sidewalls of the capping layer.

7. The method of claim 1, wherein the first outgas layer comprises a first dielectric and the second outgas layer comprises a second dielectric different than the first dielectric.

8. A method for forming an integrated chip, the method comprising:
forming a first masking layer over a capping layer;
etching the capping layer with a first etching process and with the first masking layer in place to form a pair of first recesses in the capping layer and a first capping layer protrusion disposed between the pair of first recesses, wherein the pair of first recesses are delimited by a pair of first lower surfaces of the capping layer;
depositing an outgas layer comprising a dielectric on the pair of first lower surfaces of the capping layer;
forming a second masking layer on the outgas layer, the second masking layer having a pair of second masking layer segments respectively disposed directly over the pair of first lower surfaces of the capping layer;
etching the outgas layer with a second etching process and with the second masking layer in place to remove the outgas layer from a portion the capping layer, wherein the outgas layer remains on the pair of first lower surfaces of the capping layer after the second etching process;
etching the capping layer with a third etching process to form a second recess in the capping layer, the second recess laterally spaced apart from the pair of first recesses by the capping layer;
bonding the capping layer to a micro-electromechanical system (MEMS) layer comprising a first moveable mass and a second moveable mass laterally spaced apart from the first moveable mass, wherein after the bonding, the pair of first recesses and the outgas layer delimit, in part, a first cavity in which the first moveable mass is arranged and the second recess delimits, in part, a second cavity in which the second moveable mass is arranged; and
heating the outgas layer to release an outgas species into the first cavity from the outgas layer.

9. The method of claim 8, wherein the heating is performed at least until a pressure in the first cavity is substantially greater than a pressure in the second cavity.

10. The method of claim 8, wherein the third etching process is performed with a segment of the outgas layer in place to form a second protrusion along the second recess and directly below the segment of the outgas layer, and wherein the third etching process removes the segment of the outgas layer.

11. The method of claim 8, further comprising:
depositing a bonding layer over the capping layer after the first etching process, after the second etching process, before the third etching process, and before the bonding.

12. The method of claim 8, wherein the first etching process is performed until the pair of first recesses reach a first depth, wherein the third etching process performed until the second recess reaches a second depth greater than the first depth.

13. A method for forming an integrated chip, the method comprising:
etching a capping layer to form a first recess in the capping layer, wherein the first recess is delimited by a first lower surface of the capping layer and first sidewalls of the capping layer;
etching the capping layer to form a second recess in the capping layer, the second recess laterally spaced from the first recess, wherein the second recess is delimited by a second lower surface of the capping layer and second sidewalls of the capping layer;
forming a bonding layer on the capping layer;
depositing an outgas layer on the first lower surface of the capping layer, the second lower surface of the capping layer, and the bonding layer;
removing the outgas layer from the second lower surface of the capping layer, wherein the outgas layer remains on the first lower surface of the capping layer after removing the outgas layer from the second lower surface of the capping layer; and
bonding the bonding layer to a micro-electromechanical system (MEMS) layer comprising a first moveable mass and a second moveable mass laterally spaced from the first moveable mass, wherein the first recess and the outgas layer partially delimit a first cavity in which the first moveable mass is arranged, and wherein the second recess partially delimits a second cavity in which the second moveable mass is arranged.

14. The method of claim 13, further comprising:
heating the outgas layer to release an outgas species into the first cavity from the outgas layer.

15. The method of claim 14, wherein a pressure in the first cavity is substantially greater than a pressure in the second cavity after the heating.

16. The method of claim 13, wherein removing the outgas layer from the second lower surface of the capping layer comprises:
forming a masking layer over the first lower surface of the capping layer and over a portion of the second lower surface of the capping layer, and
etching the outgas layer according to the masking layer, wherein a portion of the outgas layer remains on the second lower surface after etching the outgas layer.

17. The method of claim 16, further comprising:
etching the second lower surface with the portion of the outgas layer in place to increase a depth of the second recess, wherein etching the second lower surface with the portion of the outgas layer in place removes the portion of the outgas layer from the second lower surface, and wherein the second recess is further delimited by a pair of third lower surfaces of the capping layer after etching the second lower surface with the portion of the outgas layer in place.

18. The method of claim 13,
wherein the first recess and the second recess are formed on opposite sides of the bonding layer, and wherein the bonding layer is directly between the capping layer and the MEMS layer after bonding the bonding layer to the MEMS layer.

19. The method of claim 18, further comprising:
etching the outgas layer to remove the outgas layer from an upper surface of the bonding layer.

20. The method of claim 13, wherein the outgas layer is on the first sidewalls of the capping layer after bonding the bonding layer to the MEMS layer.

* * * * *